US008730775B2

(12) United States Patent  
Mikami

(10) Patent No.: US 8,730,775 B2
(45) Date of Patent: May 20, 2014

(54) OPTICAL INFORMATION REPRODUCING DEVICE, OPTICAL INFORMATION RECORDING DEVICE, AND METHOD FOR RECORDING OPTICAL INFORMATION

(75) Inventor: Hideharu Mikami, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 240 days.

(21) Appl. No.: 12/985,410

(22) Filed: Jan. 6, 2011

(65) Prior Publication Data

US 2011/0235485 A1   Sep. 29, 2011

(30) Foreign Application Priority Data

Mar. 29, 2010 (JP) ................................. 2010-074073

(51) Int. Cl.
 *G11B 7/00* (2006.01)
 *G11B 7/135* (2012.01)

(52) U.S. Cl.
 USPC ............... 369/44.37; 369/103; 369/112.1; 369/112.16; 369/110.01; 369/110.04; 369/112.17; 369/112.19

(58) Field of Classification Search
 USPC ......... 369/44.37, 103, 112.1, 112.16, 110.01, 369/110.04, 112.17, 112.19
 See application file for complete search history.

(56) References Cited

U.S. PATENT DOCUMENTS

| 4,711,815 | A | 12/1987 | Yoshiike et al. |
| 5,555,231 | A | 9/1996 | Yamamoto |
| 6,803,153 | B1 | 10/2004 | Kawano et al. |
| 2001/0002895 | A1 | 6/2001 | Kawano et al. |
| 2002/0159378 | A1* | 10/2002 | Lee et al. ................. 369/112.12 |
| 2002/0163873 | A1* | 11/2002 | Kawano et al. ............... 369/103 |
| 2006/0077851 | A1* | 4/2006 | Yasuda et al. ................. 369/103 |
| 2006/0280095 | A1* | 12/2006 | Tsukagoshi et al. .......... 369/103 |
| 2007/0253042 | A1 | 11/2007 | Szarvas et al. |

(Continued)

FOREIGN PATENT DOCUMENTS

| EP | 1 235 210 A1 | 8/2002 |
| EP | 1 986 187 A1 | 10/2008 |

(Continued)

OTHER PUBLICATIONS

Robert R. McLeod et al., Microholographic multilayer optical disk data storage, Applied Optics, Jun. 1, 2005, pp. 3197-3207, vol. 44, No. 16.

(Continued)

*Primary Examiner* — Aneeta Yodichkas
(74) *Attorney, Agent, or Firm* — Antonelli, Terry, Stout & Kraus, LLP.

(57) ABSTRACT

Multi-level recording is quite effective for attaining a larger capacity and a higher transfer rate in the case of an optical disk; however, with conventional technologies, a SIGNAL-TO-NOISE RATIO of a signal deteriorates along with an increase in a multi-level degree, creating a factor for limitations to the multi-level degree. In order to solve problems, when optical information is recorded by use of a standing wave occurring due to interference between two light beams, at least one of the two light beams is modulated in multi-stages. Further, at the time of regeneration, a regeneration reference beam is caused to interfere with respective polarization components of a regeneration beam, the polarization components being orthogonal to each other, thereby concurrently generating not less than three interference beams differing in interference phase from each other before being detected.

6 Claims, 23 Drawing Sheets

(56) References Cited

U.S. PATENT DOCUMENTS

| | | |
|---|---|---|
| 2008/0067321 A1 | 3/2008 | Miyamoto et al. |
| 2008/0192313 A1* | 8/2008 | Matsumura et al. ............ 359/22 |
| 2008/0205246 A1 | 8/2008 | Shimano et al. |
| 2008/0252953 A1* | 10/2008 | Lan et al. ........................ 359/30 |
| 2008/0310281 A1 | 12/2008 | Hara et al. |
| 2009/0316539 A1 | 12/2009 | Mikami et al. |
| 2011/0026390 A1 | 2/2011 | Tominago et al. |

FOREIGN PATENT DOCUMENTS

| | | |
|---|---|---|
| GB | 2 122 408 A | 1/1984 |
| JP | 58-215735 | 12/1983 |
| JP | 61-211835 | 9/1986 |
| JP | 02-064932 | 3/1990 |
| JP | 3-33864 | 2/1991 |
| JP | HEI 10-340479 | 12/1998 |
| JP | 2001-184649 | 7/2001 |
| JP | 2003-312200 | 11/2003 |
| JP | 3559590 | 5/2004 |
| JP | 2005-316278 | 11/2005 |
| JP | 2007-502501 | 2/2007 |
| JP | 2007-220206 | 8/2007 |
| JP | 2007-305218 | 11/2007 |
| JP | 2008-065961 | 3/2008 |
| JP | 4104718 | 4/2008 |
| JP | 2008-269680 | 11/2008 |
| JP | 2008-310924 | 12/2008 |
| JP | 2010-170616 | 8/2010 |
| JP | 2010-218591 | 9/2010 |
| WO | WO 2009/131097 | 10/2009 |

OTHER PUBLICATIONS

Toshihide Tsuru et la., Multi-bits coding by multi-directional valley pits permitting stamper mass-production and remote direction read-out by polarization reflection, Optics Express, Jun. 23, 2008, pp. 9622-9627, vol. 16, No. 13.

Peter Zijlstra et al., Five-dimensional optical recording mediated by surface plasmons in gold nanorods, Nature Letters, May 21, 2009, pp. 410-413, vol. 459.

Japanese Office Action dated Feb. 12, 2013; Application No. JP2010-074073; 5 pages.

English translation of Japanese Office Action dated Aug. 6, 2013; Application No. JP2010-074073; 4 pages.

Yanunori Igasaki, et al., High Efficiency Electrically-Addressable Phase-Only Spatial light Modulator; Optical Review vol. 6, No. 4 (1999) 339-344.

* cited by examiner 201 202 203 azobenzene

CONVENTIONAL ART
FIG. 26A
recording
CONVENTIONAL ART
FIG. 26B
regeneration
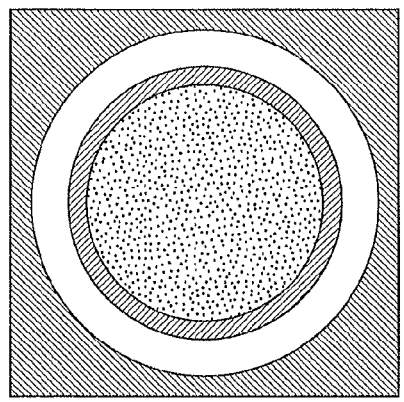
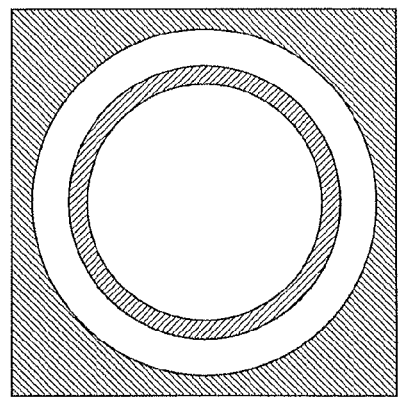
CONVENTIONAL ART
FIG. 27
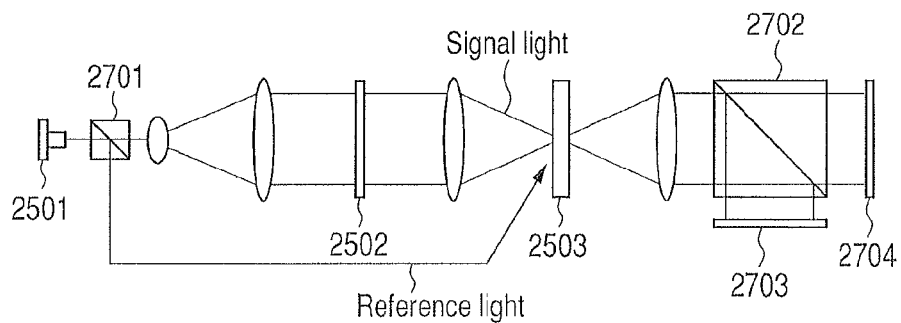
CONVENTIONAL ART
FIG. 28
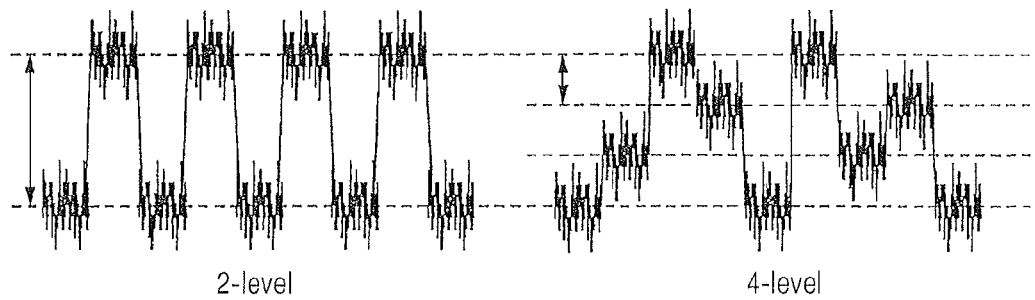
2-level        4-level

OPTICAL INFORMATION REPRODUCING DEVICE, OPTICAL INFORMATION RECORDING DEVICE, AND METHOD FOR RECORDING OPTICAL INFORMATION

CLAIM OF PRIORITY

The present application claims priority from Japanese patent application JP 2010-074073 filed on Mar. 29, 2010, the content of which is hereby incorporated by reference into this application.

CROSS-REFERENCE TO RELATED APPLICATION

This application is related to U.S. application Ser. No. 12/893,069 filed on Sep. 29, 2010, the disclosure of which is hereby incorporated by reference.

FIELD OF THE INVENTION

The invention relates to realization of a larger recording capacity of an optical device, and a higher transfer rate thereof.

BACKGROUND OF THE INVENTION

Upon commercialization of a Blu-ray Disc making use of a blue-ray laser diode, and a high-NA objective lens, an optical disk has nearly reached its limit in terms of resolving power. As a method for concurrently realizing both a further increase in recording capacity, and a further increase in transfer rate, multi-level recording is a favorable candidate. Technologies concerning the multi-level recording are described in, for example, Patent Document 1, Patent Document 2, Patent Document 3, Patent Document 4, Patent Document 5, Patent Document 6, Patent Document 7, and so forth, respectively.

With Patent Document 1, Patent Document 2, Patent Document 3, Patent Document 4, and Patent Document 5, respectively, multi-level level recording is enabled by providing a recording medium wherein reflectance of a recoding mark undergoes successive changes for power of a recording beam irradiated to the recording medium. With Patent Document 6, there is provided a method whereby a position as well as a length of a recording mark is modulated, thereby carrying out multi-level recording.

Meanwhile, with Patent Document 7, it is intended to realize an increase in recording capacity by executing multi-level recording of the phase of an information beam in a holographic memory for storing page data. The outlines of this method are described with reference to FIG. 25. First, at the time of data recording, a laser beam outgoing from a light source 2501 is modulated by a spatial light modulator 2502 before falling on a recording medium 2503, thereby recording information. Herein, the spatial light modulator 2502 is made up of a multitude of pixels, as shown in FIG. 26A, and the respective pixels apply optical phase modulation to the laser beam passing through the central part thereof to be designated as an information beam (in the figure, a white part expresses phase 0, a gray part optical phase modulation according to color strength, and a dark part transmittance 0). No modulation, or suitable optical phase modulation is applied to a portion of the laser beam, passing through the peripheral part thereof, and the portion of the laser beam is designated as a reference beam. At this point in time, an interference pattern between the information beam and the reference beam is recorded in the recording medium 2503. Then, at the time of regeneration, the spatial light modulator 2502 does not execute modulation to a portion of the laser beam, passing through the central part thereof, and the portion of the laser beam is designated as a DC beam, as shown in FIG. 26B, applying the same modulation as applied at the time of recording to the portion of laser beam passing through the peripheral part thereof, whereupon the laser beams passing through the respective parts are irradiated to the recording medium. By so doing, the information beam is generated by irradiation with the reference beam, and a beam in such a state as the DC beam with the information beam superimposed thereon is detected by an image sensor 2504. The beam detected at this point in time is due to interference occurring between the information beam, and the DC beam, and the respective pixels in the information beam are subjected to intensity modulation corresponding to the respective phases thereof before being detected. Further, the phase of the DC beam is uniformly changed by the spatial light modulator 2502, and the same measurement is executed, whereupon a phase relationship between the information beam, and the DC beam, in the respective pixels, will undergo a change, so that beams differing in intensity pattern from each other are detected by the image sensor. Thus, by obtaining outputs of the image sensor 4 when the DC beam has phases in 4-different states, 0, $\pi/2$, $\pi$, $\pi 3/2$, it is possible to obtain phase values of the information beam, in the respective pixels. Further, with Patent Document 7, intensity modulation, together with optical phase modulation, is executed, thereby enhancing a multi-level degree.

Further, with Patent Document 9, multi-level recording, and multiplex recording, using a polarization state of light, are realized in a holographic memory for storing page data by use of a medium sensitive to polarization. The outlines of this method are described with reference to FIG. 27. First, the case of the multi-level recording is described. At the time of recording, a laser beam outgoing from a light source is split into a signal beam, and a reference beam by a non-polarizing beam splitter 2701, and the signal beam passes through a spatial light modulator 2502 to be turned into a predetermined linearly polarized light beam on a pixel-by-pixel basis in the modulator before being irradiation to a recording medium. The reference beam in a state of a linearly polarized light beam, without being subjected to modulation, is irradiated to a location identical to a location irradiated with the signal beam, on a recording medium 2503. Then, at the time of regeneration, only the reference beam, in the polarization state identical to that of the reference beam at the time of recording, is irradiated to the recording medium 2503. Thence, a light beam having the polarization state identical to that of the signal beam at the time of recording is emitted from the recording medium 2503. The light beam is split into portions by a polarization beam splitter 2702, and the respective portions are detected by CCD cameras 2703, 2704, respectively. Because the CCD cameras 2703, 2704 each output values according to respective magnitudes of a p-regeneration beam and an s-polarization component, contained in the polarization state, on a pixel-by-pixel basis, the polarization state is estimated from a ratio of the magnitude between the respective components, on the pixel-by-pixel basis. Accordingly, if the state of the linearly polarized light beam is modulated in multi-stages, outputs in multi-stages, according thereto, can be obtained on the pixel-by-pixel basis, so that recording•regeneration of multi-level information is enabled. Next, the case of multiplex recording is described hereinafter. In the case of multiplex recording, the spatial light modulator 2502 shown in FIG. 27 executes the same intensity modulation as in the past, and the signal beam, and the reference beam are irradiated to the recording medium 2503 with the respective polarization states of the signal beam, and the reference beam being kept constant within a beam plane (for example, the signal beam in the p-polarization state, and the reference beam in the s-polarization state), thereby executing hologram recording. Subsequently, the p-polarization of the signal beam is changed through 90° (that is, changed to the s-polarization) by use of a half-wave plate (not shown), and so forth, and another data modulation is executed by the spatial light modulator, thereby executing hologram recording at an identical location again. At the time of regeneration, irradiation is made with only the reference beam in a polarization state identical to that of the reference beam at the time of recording. By so doing, a light beam of the signal beam in the state of the p-polarization with the signal beam in the state of the s-polarization superimposed thereon is emitted from the recording medium. Accordingly, the light beam is split into the p-polarization, and the s-polarization by the polarization beam splitter 2702, and data blocks recorded in the respective polarization states are detected by the CCD cameras 2703, 2704, respectively. That is, multiplex recording•regeneration can be realized by use of the s-polarization state, and the p-polarization state.

Meanwhile, as another approach to enhancement in recording capacity, a method has been under studies whereby light is condensed close to a diffraction limit on a recording medium, as is the case with an optical disk such as a common CD, and DVD, and two light beams opposing each other are focused at locations identical to each other, thereby recording interference fringes (standing waves) of the two light beams in the vicinity of a focusing point (refer to, for example, Non-patent Document 1, and Patent Document 8). This method is advantageous in that a multilayered recording layer is easily formed while surface recording density is the same in degree as that for a conventional optical disk, an increase in capacity is easily realized since multiplex recording is enabled, severe tolerance as required in the case of hologram recording of page data is not required although it is a method for recording interference, and mounting can be carried out with relative ease.

PRIOR ART LITERATURE

Patent Documents

[Patent Document 1] JP-A-2001-184649 (corresponding to EP 1235210)
[Patent Document 2] JP-A-58(1983)-215735 (corresponding to GB 2122408)
[Patent Document 3] JP-A-2(1990)-064932 (corresponding to GB 2122408)
[Patent Document 4] Japanese Patent No. 3559590
[Patent Document 5] JP-A-61(1986)-211835 (corresponding to U.S. Pat. No. 4,711,815)
[Patent Document 6] Japanese Patent No. 3033864 (corresponding to U.S. Pat. No. 55,552,321)
[Patent Document 7] JP-A-2008-310924 (corresponding to US 2008/0310281)
[Patent Document 8] JP-A-2007-220206 (corresponding to EP 1986187A)
[Patent Document 9] Japanese Patent No. 4104718

Non-Patent Document

[Non-patent Document 1] "Microholographic multilayer optical disk datastorage" by R. R. Mcleod, et al., Appl. Opt., Vol. 44, 2005, pp. 3197

SUMMARY OF THE INVENTION

In Patent Document 1, Patent Document 2, Patent Document 3, Patent Document 4, and Patent Document 5, respectively, discrimination between multi-levels is made according to magnitude of a reflection beam amount level, however, this represents the same state as a state where a difference between levels to be discriminated is very small as compared with the case of executing recording-regeneration at binary levels as is the case with a common optical disk, as shown in FIG. 28, so that a signal level, in effect, undergoes deterioration. More specifically, there exists an intrinsic problem that it is, in effect, difficult to realize a greater multi-level because a SIGNAL-TO-NOISE RATIO of a signal deteriorates in proportion to a multi-level degree (the number of levels). In Patent Document 6 as well, it is difficult to realize a substantial increase in multi-level degree because a signal beam is detected by use of a multitude of detectors, resulting in a drop in an amount of light, per each of the detectors, and insufficiency in a SIGNAL-TO-NOISE RATIO, as is the case with the above-mentioned. Furthermore, since the needs for the multitude of the detectors, and complex signal processing for outputs of those detectors will arise, there is a concern with complication of a device, and an increase in cost.

Further, with Patent Document 7, in order to read phase information as recorded, it is necessary to execute readout for one recording location four times. In addition, the phase of the DC beam need be changed at each readout, and time corresponding to the order of a response speed of an optical phase modulator is required for phase changeover, so that an effective data read rate (as compared with the case of executing conventional intensity modulation) will substantially deteriorate. Further, because power of the light source, and scattered light at the recording medium, accompanying the power of the light source, undergo fluctuation during the four readouts, respective values of the four readouts, for use in estimation on a phase value, contain an error at random. As a result, an estimated phase value will fluctuate. Similarly, the noise of the detector will be a cause of fluctuation in the phase value. Phase fluctuation attributable to the detector does not pose a problem if an optical intensity level as detected is sufficiently high. If the optical intensity of the DC beam is sufficiently high, a satisfactory optical intensity level can be secured, however, in reality, there are limitations to an amount of light, inputted to the detector, due to saturation occurring to the detector, so that there exists the risk that a satisfactory optical intensity level cannot be obtained. For reasons described as above, with the method described in Patent Document 7, there occurs fluctuation in the phase value, and therefore, it is effectively difficult to substantially increase the multi-level degree of phase.

Further, as a regeneration method of the method described in Patent Document 9, in the case of multi-level recording regeneration, making use of the polarization state, it is necessary to combine an output of the p-polarization component with an output of the s-polarization component, and in order to provide compatibility between pixel information pieces detected by the two CCD cameras, respectively, it is necessary to execute positioning of two CCD cameras with extreme precision, so that there exists a problem that mounting of a device will be very difficult. Further, with this method, it is impossible to obtain information on a phase difference between the p-polarization, and the s-polarization, making up the light beam as regenerated, so that, for example, it is impossible to discriminate between ±45° polarizations. Accordingly, a modulation range of polarization is limited to a range of from a linearly polarized light beam at 0-degree (the p-polarization) to a linearly polarized light beam at 90-degree (the s-polarization). There exists therefore a problem that it is difficult to realize a substantial increase in multi-level because enhancement in the multi-level degree will lead to insufficiency in the SIGNAL-TO-NOISE RATIO for the same reason as described in Patent Document 1, and so forth. Further, for multi-level modulation of polarization, use is generally made of a spatial light modulator based on a liquid crystal element, and since response of the modulator, for a drive voltage, is nonlinear, as the multi-level degree becomes higher, so does more difficult accurate execution of the multi-level modulation. In addition, owing to adoption of a structure wherein modulation is individually applied to the multitude of the pixels, an increase in cost as well as size of the modulator will result.

In the case of the multiplex recording·regeneration by making use of polarization states, the method described in Patent Document 9 has an advantage in that the recording capacity is increased as is the case with the multi-level recording, however, it has a problem that time for recording data will increase in proportion to an increase in the recording capacity because recording of the respective polarization states need be successively executed.

Further, the methods described in Patent Document 7, and Patent Document 9, respectively, being basically a method for creating a hologram of page data, the methods each are carrying an intrinsic problem in that owing to severe tolerance for adjustment parameters of the device, such as a wavelength of the light source, an angle of incidence to the recording medium, and so forth, it will not be easy to carry out the method.

With the methods described in Patent Document 8, and Non-patent Document 1, respectively, there exists a problem in that it will be difficult to realize enhancement in data transfer rate because surface recording density does not exceed that according to the conventional technologies while an increase in capacity is easily realized. Further, with these methods, intensity of the signal beam is generally weak, and the signal level effectively drops when the multi-level recording/regeneration is carried out, as is the case with Patent Document 1, so that there occurs considerable insufficiency in the SIGNAL-TO-NOISE RATIO. Accordingly, it is, in effect, difficult to realize the multi-level recording/regeneration.

In view of those problems described in the foregoing, it is a first object of the invention to provide an optical information reproducing device capable of realizing high-speed regeneration from an optical information-recording medium having a high recording density.

A second object of the invention is to provide an optical information recording device capable of rendering a high recording density compatible with a high recoding speed.

In order to attain the first object, use is made of the following means.

(1) A regeneration reference beam generated from a light source is caused to interfere with respective polarization components of a regeneration beam generated from a recording medium, the polarization components being orthogonal to each other, thereby concurrently generating not less than three interference beams differing in interference phase from each other for the respective polarization components, the interference beams are detected by a detector and recorded information contained in the regeneration beam is demodulated by signal processing on the basis of outputs of the detector.

By so doing, discrimination between, for example, ±45° linearly polarized light beams is enabled, so that polarization modulation higher in multi-level degree than in the case of a conventional method can be identified. Further, because amplification of signal amplitude can be concurrently executed by interference with the regeneration reference beam high in intensity, it is possible to avoid deterioration in a SIGNAL-TO-NOISE RATIO, which will cause a problem upon enhancement of the multi-level degree, and a signal can be regenerated at a satisfactory SIGNAL-TO-NOISE RATIO even in the case of the regeneration signal high in the multi-level degree.

(2) In the signal processing under (1) as above, a polarization angle of the regeneration beam is outputted. By so doing, the polarization angle as modulated will be in a linear relationship with an output signal, so that the polarization angle can be identified with excellent precision, (3) Further, in the signal processing under (2) as above, at least either of intensity of the regeneration beam, and phase against the regeneration reference beam, together with the polarization angle of the regeneration beam, is outputted. By so doing, it becomes possible to identify a modulation signal still higher in the multi-level degree. Further, since an output of phase is an output unaffected by laser noise, and disc noise due to fluctuation in intensity of the regenerated, it is possible to improve identification precision in multi-level modulation of phase.

(4) As another method of the signal processing under (1) as above, at least either of intensity of the respective polarization components of the regeneration beam generated, orthogonal to each other, and phase of the regeneration reference beam is outputted. By so doing, it is possible to concurrently regenerate multiplexed data blocks from the recording medium subjected to polarization multiplex recording, and to enhance a data read speed.

In order to attain the second object, use is made of the following means.

(5) There are provided units that cause two light beams proceeding from directions opposing each other to be condensed at a substantially identical location in an optical information recording medium, thereby record a standing wave occurring due to interference between the two light beams, and a polarization modulation unit that modulates at least one of the two light beams in multi-stages.

By so doing, it becomes possible to use an element exhibiting a linear response as a modulation unit, enabling enhancement in multi-level degree.

Further, as a substantially identical location, it will be sufficient if Gaussian distributions of light are overlapped to an extent that a standing wave occurs due to interference between two light beams.

(6) In (5) as above, the polarization modulation unit is defined as an electro-optical modulator. By so doing, since magnitude of polarization modulation is in a linear relationship with a drive voltage, multi-level modulation can be carried out with excellent precision, contributing to enhancement in multi-level degree.

(7) In (5) as above, the polarization modulation unit is a polarization modulation unit that executes modulation such that a linearly polarized light state in which optical electric fields vibrate in directions identical to each other, occurs at a location where the two light beams are condensed in the recording medium.

As a result, it is possible to reduce a modulation range of polarization angle at the time of recording, necessary to realize a predetermined modulation range of the polarization angle of the regeneration beam, so that polarization modulation sufficiently high in multi-level degree can be executed even if the modulation range of a polarization modulator is narrow.

(8) With reference to (5) as above, the two light beams are generated by splitting a single light beam by use of a non-polarization splitting unit, and the polarization modulation unit is a single polarization modulation unit that modulates a polarization state of the single light beam.

As a result, polarization modulation of two light beams can be executed by one unit of the polarization modulation unit, rendering it possible to realize simplification of a device, reduction in device size, and reduction in device cost.

(9) With reference to (5) as above, further the optical phase modulation, and the intensity modulation are concurrently applied to the standing wave to be recorded. By so doing, since three independent parameters such as polarization, phase and intensity of light are used for signal modulation, it is possible to attain substantial enhancement in multi-level degree, and to attain a substantial increase in recoding density and data transfer rate.

(10) As another means, multiplex recording executed by use of polarization states. More specifically, there are provided a unit that causes first and second light beams proceeding from directions opposed to each other, respectively, to be condensed at locations substantially identical to each other, in an optical information recording medium, thereby records a standing wave occurring due to interference between the first and second recording light beams, while, for modulation, at least either of optical phase modulation and intensity modulation is executed, respective polarization states of the two light beams at the time of recording are set to two different ways, and the phase and the intensity modulation are executed at respective settings. As a result, enhancement in recording density can be attained. The effect of multiplex recording is equivalent to doubling of a multi-level degree, and the higher the multi-level degree of phase•intensity modulations is, the effect of an increase in recording density is greater.

(11) In recoding under (10) as above, in order to concurrently execute recording by setting a polarization state in two different kinds, use is made of two light beams obtained by splitting a light beam generated by combining two light beams incoherent with each other at the time of recording. Phase-intensity modulations are concurrently applied to two components incoherent with each other, respectively. Herein, description stating that the light beams to be combined together are incoherent with each other denotes that a phase relationship between these light beams at a point in time for combination is undefined, which is a prerequisite for preventing interference between two kinds of data blocks to be subjected to multiplex recording. This is a condition under which two standing waves to be subjected to multiplex recording are independently recorded. If recording is executed in this way, this will enable not only recording density, and a regeneration speed but also a recording speed to be concurrently enhanced.

(12) With reference to the unit under (11) as above, as a unit that generates two light beans coherent with each other, use is made of a configuration wherein a light beam from a single light source is split into two light beams to be combined together to be accompanied by a difference between optical path lengths sufficiently larger than a coherence length of the light source. The coherence length of the light source denotes a difference in optical path lengths at which a difference in intensity between an interference beam in a constructive interference state, and an interference beam in a destructive interference state become half as compared with that in the case where a difference in optical path lengths at the time of combination is zero when the light beam from the light source is split into two beams to be then combined with each other to cause interference. If two light beams that are split with a difference between optical path lengths, sufficiently larger than the coherence length before being combined, a phase relation ship between the two light beams becomes undefined, whereupon combination is made in a incoherent state. With the adoption of such a configuration as above, it is possible to generate two light beams incoherent with each other by use of a single light source, enabling multiplex•concurrent recordings at a low cost. Herein, by a sufficiently large difference between optical path lengths is meant a difference between optical path lengths with which two light beams can be combined with each other without causing interference.

(13) With reference to the unit under (11) as above, as another unit that generates two light beams incoherent with each other, use is made of respective light beams from two different light sources oscillating at wavelengths identical to each other. By so doing, with the use of a simple configuration, multiplex-concurrent recordings are enabled.

(14) With reference to (10) as above, in the case where use is made of a recoding medium provided with a mirror surface for reflecting a light beam, there is adopted a drive configuration wherein two light beams fall on a recoding medium from directions identical to each other at the time of recording. With the conventional technologies, in the case of a configuration for allowing two light beams fall on the recoding medium from directions identical to each other, there is the need for polarization states of the two light beams being identical to each other. For that purpose, the two light beams are combined with each other by a beam splitter, and so forth. Then, a half of an amount of light is inevitably lost, and therefore, light-utilization efficiency has been low. In contrast, with the present means, the polarization states of the two light beams beam can be orthogonal to each other, and by combining the two light beams with each other by use of, for example, a polarization beam splitter, it is possible avoid loss in the amount of light, thereby enhancing light-utilization efficiency.

A method for regenerating information recorded in a recoding medium by use of the optical information reproducing device, and a method for recording information in a recoding medium by use of the optical information reproducing device will have advantageous effects as above.

With the adoption of the configurations describe as above, it becomes possible to obtain a regeneration signal high in multi-level degree while keeping a high SIGNAL-TO-NOISE RATIO at the of regeneration, and to make use of an element exhibiting linear responsiveness at the of recording, thereby attaining enhancement in multi-level degree, so that regeneration as well as recording at a high speed and high density can be realized.

BRIEF DESCRIPTION OF THE DRAWINGS

FIG. 26A and FIG. 26B each are a view showing a modulation pattern made by a spatial light modulator according to the conventional technology, in which FIG. 26A shows the pattern at the time of recording, and FIG. 26B shows the pattern at the time of regeneration;

FIG. 27 is a view broadly showing a configuration according to another conventional technology, wherein polarization modulation and polarization multiplex recording are executed in a holographic memory for storing page data;

FIG. 28 is a schematic representation for describing deterioration in a SIGNAL-TO-NOISE RATIO upon execution of multi-level modulation by use of conventional technologies;

DETAILED DESCRIPTION OF THE PREFERRED EMBODIMENTS

First Embodiment

A first embodiment of an optical device according to the invention is described hereinafter with reference to FIG. 1.

Figure 1:
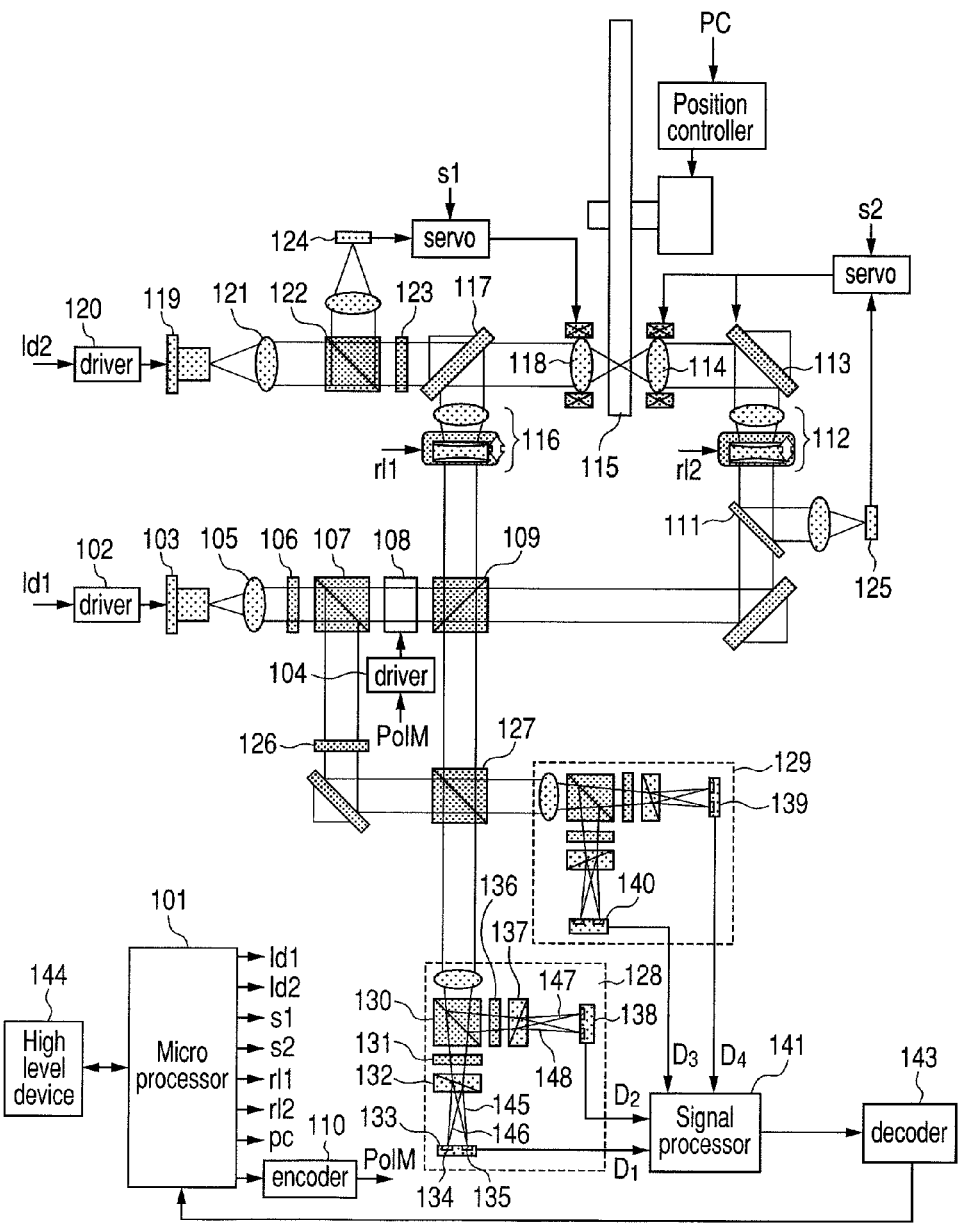
FIG. 1 is a block diagram showing a first embodiment (a fundamental embodiment) of an optical device according to the invention.

FIG. 1 shows a fundamental embodiment of an optical device according to the invention. First, operation at the time of recording is described. In accordance with an instruction from a microprocessor 101, a driver 102 executes pulse-driving in sync with signal modulation by a driver 104 that will be described later in the present description for a laser diode 103, thereby causing the laser diode 103 to emit pulses. A laser beam from the laser diode 103 is turned into parallel rays by a collimation lens 105 to be transmitted through a half-wave plate 106 before falling on a polarization beam splitter 107. The polarization beam splitter 107 has the function of transmitting nearly 100% of p-polarization falling on a splitting surface thereof while reflecting nearly 100% of s-polarization. The polarization state of the laser beam from the laser diode 103 is the p-polarization, the light axis direction of the half-wave plate 106 is set at 0° from the horizontal plane at the time of recording, and the laser beam in whole is transmitted through the polarization beam splitter 107. Subsequently, the laser beam passes through a polarization modulator 108, and the polarization state of the laser beam is modulated by the driver 104 to be driven in sync with pulse emission from the laser diode 103 before falling on a non-polarizing beam splitter 109, whereupon the laser beam as modulated is split into a transmission beam, and a reflection beam. Herein, in the transmission beam, a polarization state modulated by the polarization modulator is held, and in the reflection beam, a polarization direction is mirror-reversed, as is the case with mirror reflection (this change in polarization is equivalent to occurrence of a phase difference at 180-degrees between the p-polarization, and the s-polarization). The transmission beam (hereinafter referred to as a signal beam), and the reflection beam (hereinafter referred to as a reference beam) are used for recording.

Figure 2:
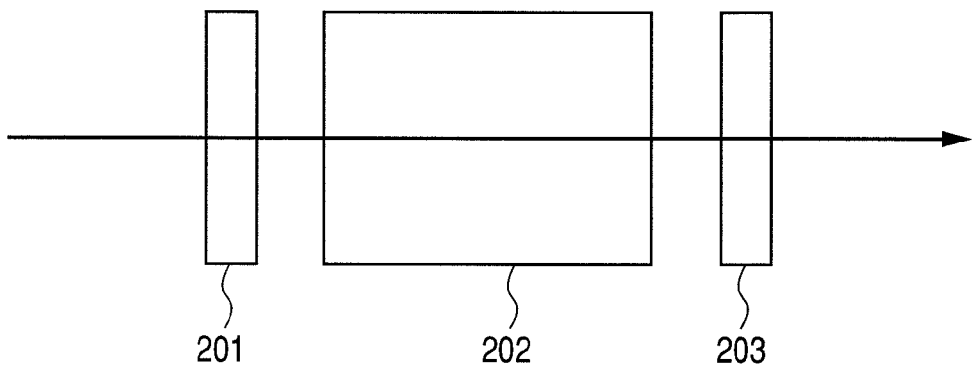
FIG. 2 is a schematic representation showing a configuration of a polarization modulator according to the first embodiment.

At the polarization modulator, user-data sent out from a microprocessor 101 is encoded as multi-level data by an encoder 110, and the multi-level data is sent out to the driver 104 to serve as a modulation signal of the polarization modulator. The polarization modulator converts a light beam of linear polarization, delivered thereto, into a predetermined linearly polarized light beam, and the polarization modulator according to the present embodiment is of a configuration shown in FIG. 2, using an electro-optic element 202. The light beam of the p-polarization, delivered to the modulator, passes through a half-wave plate 201 whose axial direction is set at 22.5-degrees from the horizontal polarization to be turned into a linearly polarized light beam in a 45-degree direction, equally containing a p-polarization component and an s-polarization component. This state is expressed in terms of Jones vector as follows:

$$\frac{1}{\sqrt{2}}\begin{pmatrix} 1 \\ 1 \end{pmatrix} \qquad \text{Formula (1)}$$

A first component indicates the p-polarization component, and a second component indicates the s-polarization component. Next, the light beam passes through the electro-optic element 202, whereupon there occurs a phase difference $\phi$ between the s-polarization component, and the p-polarization component corresponding to a drive voltage. Herein, the polarization state of the light beam is expressed as follows:

$$\begin{pmatrix} 1 & 0 \\ 0 & e^{i\phi} \end{pmatrix}\begin{pmatrix} 1/\sqrt{2} \\ 1/\sqrt{2} \end{pmatrix} = \frac{1}{\sqrt{2}}\begin{pmatrix} 1 \\ e^{i\phi} \end{pmatrix} \qquad \text{Formula (2)}$$

Lastly, the light beam passes through a quarter-wave plate 203 whose axial direction is set at 45-degrees from the horizontal direction. At this point in time, the polarization state is expressed as follows:

$$\frac{1}{2}\begin{pmatrix} 1 & i \\ i & 1 \end{pmatrix}\frac{1}{\sqrt{2}}\begin{pmatrix} e^{i\phi/2} \\ e^{-i\phi/2} \end{pmatrix} = \qquad \text{Formula (3)}$$

$$\frac{1}{2\sqrt{2}}\begin{pmatrix} e^{i\phi/2} + ie^{-i\phi/2} \\ ie^{i\phi/2} + e^{-i\phi/2} \end{pmatrix} = i\begin{pmatrix} \cos\left(\frac{\phi}{2} + \frac{\pi}{4}\right) \\ \sin\left(\frac{\phi}{2} + \frac{\pi}{4}\right) \end{pmatrix}$$

The direction of the linear polarization of the light beam outputted according to the phase difference $\phi$ at the electro-optic element 202 is changed, whereupon modulation of a polarization direction is realized. A rotation angle of the polarization is $\phi/2$ (unit: radian) for the phase difference $\phi$ occurring to the electro-optic element 202. Herein, a point of importance is that an optical phase modulation amount of the electro-optic element is in strictly linear relationship with the rotation angle of the polarization. Further, since a phase change in relation to a drive voltage of the electro-optic element is substantially linear, a change in polarization angle, in relation to the drive voltage, represents a linear response. This denotes that even if the multi-level degree is high, modulation can be realized with excellent precision. With the present embodiment, 8-level modulation is adopted, the phase difference $\phi$ occurring to the electro-optic element 202 is modulated at eight-different values of $0, \pm\pi/8, \pm\pi/4, \pm 3\pi/8, \pi/2$, and the direction of the p-polarization is set to $0°$, thereby causing generation of eight different linear polarizations at $0°$, $\pm 11.25°$, $\pm 22.5°$, $\pm 33.75°$, $45°$. Further, the polarization modulator is not limited to the above, and for the polarization modulator, use may be made of a magneto-optical element besides the above.

Even if the polarization modulator inserts the signal beam, and the reference beam in respective optical paths to thereby apply an identical polarization thereto, an identical polarization modulation can be realized. With the present embodiment, polarization modulation is applied to the light beam in a state in which the light beam is not split into the signal beam and the reference beam as yet, and it is intended to simplify an optical system by controlling the number of the polarization modulators to the minimum.

Now, the signal beam passes through a beam sampler 111 (transmittance at not less than 90%, reflectance at not more than 10%), and a relay lens 112 to be reflected by a galvano-mirror 113 before condensed on a recording medium 115 by an objective lens 114. On the other hand, the reference beam passes through a relay lens 116 to be reflected by a dichroic mirror 117 before condensed in the recording medium 115 by an objective lens 118.

Figure 3A:
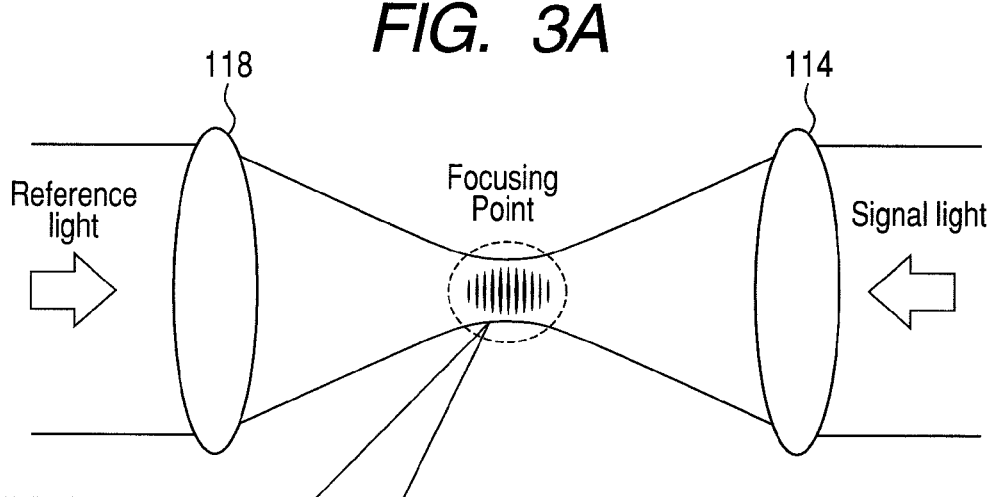
FIG. 3A and FIG. 3B each are a schematic representation showing generation of a standing wave by the agency of light beams whose travelling directions are diametrically opposed to each other.
Figure 3A:
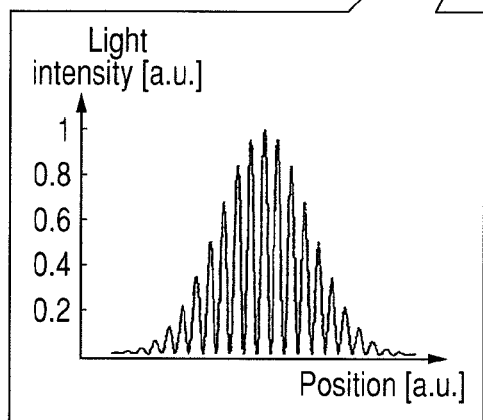

When the signal beam, and the reference beam are condensed at locations identical to each other on the recording medium 115, there occur standing waves (interference fringes) over an optical intensity distribution due to interference occurring between the signal beam, and the reference beam, both the beams being in a polarization state, in which travelling directions of light beams are diametrically opposed to each other while electric fields thereof vibrate in directions identical to each other, as shown in FIG. 3.

Because power densities of the signal beam, and the reference beam, respectively, become abruptly high in the vicinity of a focusing point, the standing waves each come to be substantially localized in the vicinity of the focusing point, as shown in FIG. 3A. The recording medium 115 is a medium sensitive to polarization, birefringence occurs to the medium according to a polarization state of each of the standing waves at respective positions, and intensities thereof, and a pattern of the interference fringes is recorded as a spatial distribution of the birefringence of the medium.

Figure 4A:
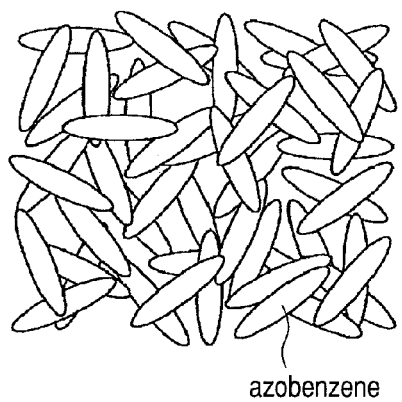
FIG. 4A and FIG. 4B each are a schematic representation showing that azobenzene molecules are variously oriented by irradiation with a light beam.
Figure 4B:
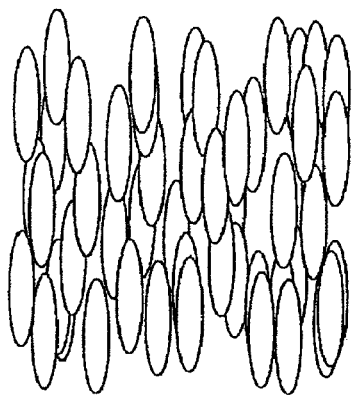

Now, the principle underlying the recording according the invention is described hereinafter. The recording medium sensitive to polarization, for use in carrying out the invention, is a medium whose axis is the polarization direction of a light beam to be irradiated, birefringence occurring thereto. An acrylic polymer having azobenzene, as a side chain, is well knows as a specific example of the medium. In a molecular structure of the medium before irradiation with a light beam, respective azobenzene molecules are oriented in random directions as shown in FIG. 4A, having no anisotropy. When the medium is irradiated with a light beam, the respective azobenzene molecules absorb energy of an irradiation light beam to be oriented in the direction perpendicular to the polarization direction of the irradiation light beam, as shown in FIG. 4B. In this case, since the azobenzene molecule is slender in shape, refractive index thereof, in the longitudinal direction, differs from that in the direction perpendicular thereto. Accordingly, the medium in a state shown in FIG. 4B after irradiation with the light beam, has refractive index in a direction of molecular orientation, differing from refractive index in, the direction perpendicular to the direction of the molecular orientation, so that anisotropy occur to the medium. Since magnitude of anisotropy is proportional to the umber of molecules as oriented, the magnitude of anisotropy is proportional to optical intensity (energy density) as irradiated.

Figure 3B:
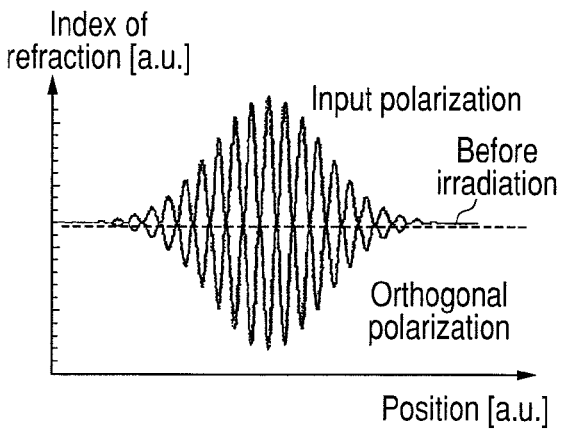

Suppose we consider the case of the standing waves of the light beam, as shown in FIG. 3A, occurring to the recording medium, as described above. With the present embodiment, two light beams, in as-irradiated state, each are in a polarization state, where electric fields vibrate in directions identical to each other (more specifically, if, for example, one light beam represents polarization in a 45-degree direction as seen from the travelling direction of the light beam, the polarization of the other light beam is at minus 45-degree as seen from the travelling direction of the light beam). Accordingly, the standing wave that occurs also undergoes vibration in directions identical to each other. At this point in time, refractive index of the standing wave, in a vibration direction (polarization direction), is modulated in a direction toward larger refraction index than that before irradiation, as shown in FIG. 3B, due to a process described as above, as is the case with the intensity distribution of the standing waves. On the other hand, refractive index in the direction orthogonal to the vibration direction of the standing wave is recorded in a direction toward smaller refractive index than that before the irradiation, as shown in FIG. 3B, as is the case with the intensity distribution of the standing waves. This is because the refractive index before recording represents a mean value of refractive index of the molecule of the medium, in the longitudinal direction thereof, and refractive index of the molecule, in a direction along a shorter length thereof, an increase in refractive index, in the polarization direction of the light beam for recording, will lead to a decrease of refractive index in a direction perpendicular thereto. Now, suppose we consider the case of a light beam being irradiated to the medium in which recording has been made to thereby regenerate a signal. At this point in time, a polarization component of a irradiated beam, in the polarization direction of the standing wave at the time of recording, and a component thereof, crossing the polarization component at right angles, are each scattered according to a refractive index distribution shown in FIG. 3B, thereby generating an optical feedback. It is known that the electric field of a scattered beam is generally proportional to a modulation amount of refractive index (that is, an amount of change from the refractive index prior to irradiation). Herein, as is evident from FIG. 3B, respective modulation amounts of refractive index, in the two polarization directions, are identical in magnitude to each other, and reversed in sign from each other. This denotes that the respective phases of the scattered beams, in the two polarization directions, respectively, differ from each other by $\pi$. In reality, since the scattered beam is generated as if it is reflected by a mirror in a direction opposite from the irradiated beam, the scattered beam ends up in a state equivalent to a state where the irradiated beam is reflected by a mirror, passing through the half-wave plate. Then, the polarization direction of the irradiated beam at the time of recording will be the axial direction of this imaginary half-wave plate. Accordingly, by modulating the polarization direction of the irradiated beam at the time of recording, the optical feedback (the scattered beam) at the time of regeneration can be modulated, and by detecting the polarization direction of the optical feedback, recoding information can be regenerated.

Figure 5:
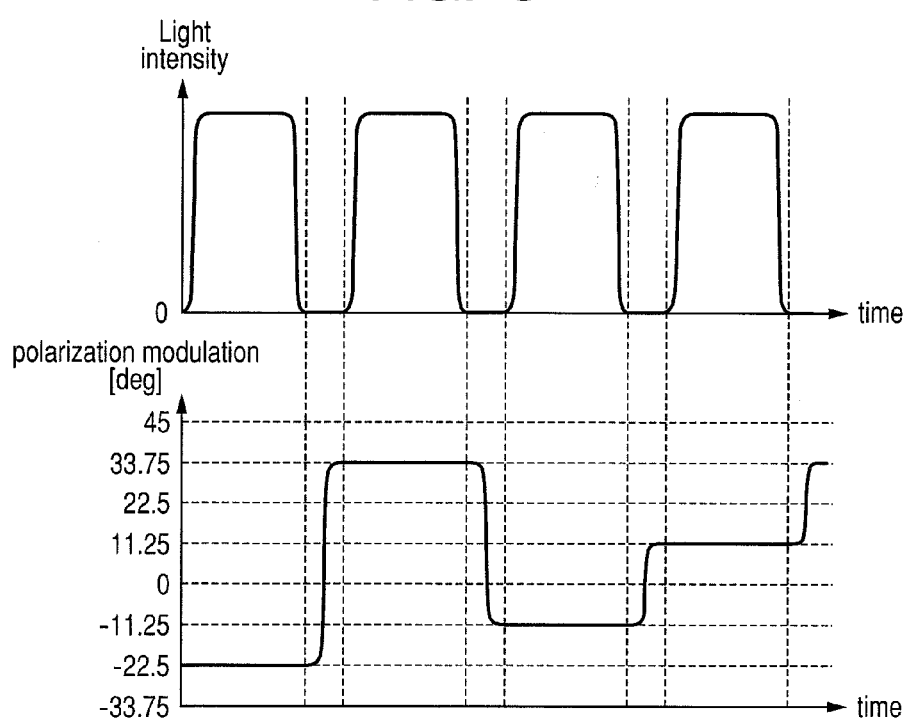
FIG. 5 is a diagram showing a relationship between optical phase modulation and a light emission pattern of the light source.

Now, an emission pulse, and modulation of the polarization modulator 108 are described in detail hereinafter. It is desirable that modulated polarization remains at a constant value while one polarization modulation signal is recorded in the recording medium. Otherwise, interference fringes corresponding to a plurality of polarization directions differ from each other are recorded at one location, thereby causing deterioration in regeneration signal level, and an error in a regeneration signal. For this reason, a modulation phase of the polarization modulator can be fixed while the light source is in an emission state to be changed over to the next modulation phase when the light source is in a non-emission state, as shown in FIG. 5.

Figure 6:
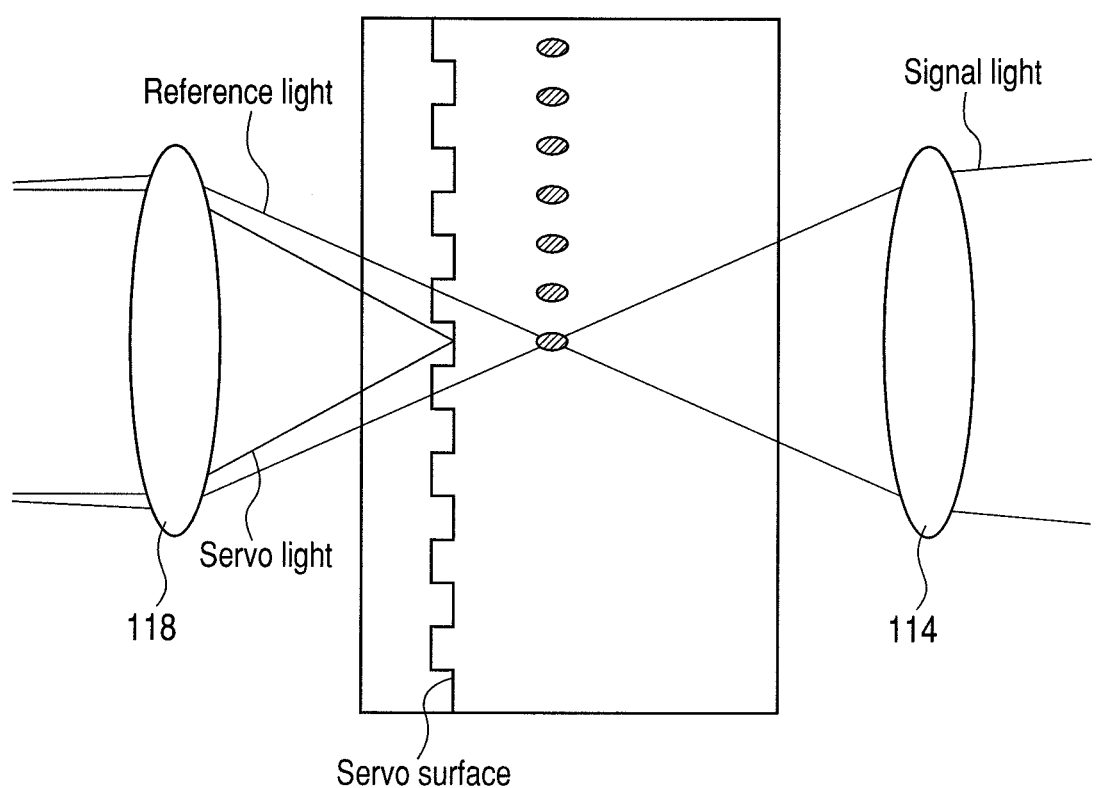
FIG. 6 is a schematic representation showing respective behaviors of a signal beam, a reference beam and a servo beam, inside a recording medium, and a phase of a regeneration beam being modulated by a position of standing wave as recorded.

Now, reverting to FIG. 1, there is described a servo-mechanism for carrying out a stable recording operation. A laser diode 119 is a laser diode causing vibration at a wavelength different from that of the laser diode 103, and is driven by a driver 120 in accordance with an instruction from the microprocessor 101, thereby emitting a light beam of the p-polarization (hereinafter, the light beam is referred to as a servo beam). With the present embodiment, a wavelength of the laser diode 103 is set to 405 nm, and a wavelength of the laser diode 119 is set to 650 nm. The light beam passes through a collimation lens 121 to be turned into parallel rays to subsequently pass through a polarization beam splitter 122, and a quarter-wave plate 123 to be turned into right-handed circularly polarized light before falling on the dichroic mirror 117. The dichroic mirror 117 has a nature for reflecting a beam having a wavelength at 405 nm while transmitting a beam having a wavelength at 650 nm therethrough, thereby rendering the reference beam coaxial with the servo beam. The servo beam is condensed on a servo layer formed in the recording medium 115 by the action of the objective lens 118 (refer to FIG. 6). Grooves are formed on the servo layer, as is the case with a recording type CD, DVD, and so forth, and a focusing servo, and a tracking servo can be operated by detecting a reflection beam from the servo layer by use of a quadrant detector 124, and feeding a servo signal back to an objective lens actuator. With the present embodiment, for the focusing servo, an astigmatic method is adopted while for tracking servo, a push-pull method is adopted. In this case, since the reference beam is kept coaxial with the servo beam, relative positions of respective focusing points on the recording medium can be maintained. Accordingly, the interference fringes can be recorded on a plane at a constant distance from the servo layer by properly setting the relay lenses 112, 116, respectively. Further, the position of the focusing point of the reference beam, in the light axis direction thereof, is changed by moving one lens of reference lenses, in the axial direction thereof. By so doing, multilayered recording can be realized in a uniform recording medium. Further, the relay lenses 112, 116, at respective settings, are designed such that spherical aberrations occurring to the recording medium can cancel each other out, and focusing at a diffraction limit can be carried out.

Further, with the present embodiment, use is made of another light source for generation of the servo beam, separate from the laser diode 103 for generation of the signal beam, and the reference beam, however, this is not an essential configuration for carrying out the invention, and the signal beam, the reference beam, and the servo beam may be generated from one and the same light source.

Meanwhile, the signal beam need be condensed at the focusing point identical to the focusing point of the reference beam. For this reason, servo drive is executed by use of the reference beam that has passed through the objective lens 114. More specifically, the reference beam having passed through the recording medium 115 is guided to a quadrant detector 125 by use of the beam sampler to be detected, the position of the objective lens 114, in the axial direction thereof, is controlled by the astigmatic method while the position of the objective lens 114, in the radial direction thereof, is controlled by the push-pull method in the radial direction thereof, and an angle of the galvano-mirror 113, in the tangential direction thereof, is controlled by the push-pull method in the tangential direction thereof. By so doing, it is possible to cause the reference beam to completely agree in light beam with the signal beam (except for respective travelling directions thereof are opposed to each other), so that the standing wave effectively occurs by causing the focusing point of the signal beam to coincide with the focusing point of the reference beam.

Next, operation at the time of regeneration is described. The laser diode 103 emits a DC beam, and the DC beam passes through the half-wave plate 106 before falling on the polarization beam splitter 107. Herein, the light axis direction of the half-wave plate 106 is set at 22.5-degrees from the horizontal direction at the time of regeneration, and the p-polarization component of the light beam in the 45-degrees polarization is transmitted through the polarization beam splitter 107 while the s-polarization component thereof is reflected from the polarization beam splitter 107. A reflection beam in the s-polarization state is turned into the 45-degrees polarization by a half-wave plate 126 having an axial orientation set at 22.5° to fall on a polarization beam splitter 127. This light beam is hereinafter referred to as a regeneration reference beam. A transmission beam in the p-polarization state passes through the polarization modulator 108 in a state where the drive voltage is not applied thereto (that is, in a state where no modulation is made), and falls on the non-polarizing beam splitter 109 to be split into the transmission beam, and the reflection beam. Herein, at the time of regeneration, use is made of only either of the transmission beam, and the reflection beam. With the present embodiment, since use is made of the reflection beam, the transmission beam is shielded by use of a shutter (not shown), and so forth. The reflection beam proceeds through the same optical path as that for the reference beam at the time of recording to be condensed in the recording medium 115 by the objective lens 118 that is servo-controlled by the light beam of the laser diode 119, as in the case of recording. In this case as well, by properly setting the relay lens 116, the reference beam is condensed at a predetermined location on the recording medium.

Herein, when the reference beam is irradiated to a location where the standing wave, as a change in refraction index, is recorded at the time of recording, the reflection beam is generated due to a cyclic change in refraction index. Then, the reflection beam receives a phase change equivalent to the half-wave plate whose axial orientation corresponds to the polarization direction at the tome of recording, and the reflection beam is subjected to polarization modulation. This reflection beam is hereinafter referred to as a regeneration beam. With the present embodiment, the polarization direction of the reference beam at the time of recording is modulated in eight different ways at 0°, ±11.25°, ±22.5°, ±33.75°, and 45°, so that the polarization direction of the regeneration beam is modulated in eight different ways at 0°, 22.5°, 45°, 67.5°, 90°, 112.5°, 135°, and 157.5°

Figure 7:
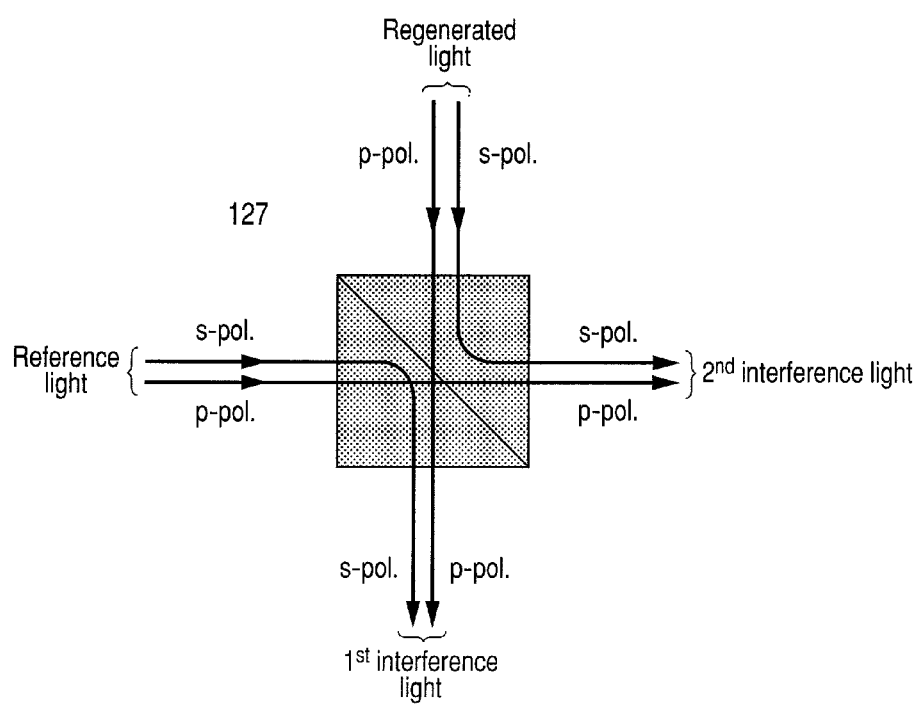
FIG. 7 is a schematic representation showing the regeneration beam being combined with a regeneration reference beam by a polarization beam splitter.

The regeneration beam proceeds through an optical path in a direction opposed to the optical path of the light beam irradiated to the recording medium 115 to fall on the non-polarizing beam splitter 109, thereby being split into the transmission beam, and the reflection beam, however, only the transmission beam is used for regeneration. This transmission beam falls on the polarization beam splitter 127 from a direction different from an incident direction of the regeneration reference beam. At this point in time, the polarization beam splitter 127 transmits the p-polarization therethrough, and reflects the s-polarization therefrom, so that the p-polarization component of the regeneration beam is rendered coaxial with the s-polarization component of the regeneration reference beam to thereby generate one light beam (hereinafter referred to as a first interference beam), as shown in FIG. 7, while the s-polarization component of the regeneration beam is rendered coaxial with the p-polarization component of the reference beam to thereby generate another light beam (hereinafter referred to as a second interference beam). These light beams fall on detection optical systems 128, 129, respectively. The first interference beam is split into two portions, that is, the transmission beam, and the reflection beam, by a non-polarization half-beam splitter 130. The transmission beam passes through a half-wave plate 131 whose optical axis is set at 22.5-degrees from the horizontal direction to be rotated through 45 degrees in polarization before being split into the p-polarization component and the s-polarization component by a Wollaston prism 132. Split light beams fall on photodiodes 134, 135 of a differential detector 133, respectively, whereupon electric signals proportional to intensity differences, respectively, are outputted from the differential detector 133. Similarly, the light beam reflected by the non-polarization half-beam splitter 130 passes through a quarter-wave plate 136 whose optical axis is set at 45-degrees from the horizontal direction to be split by a Wollaston prism 137 before being similarly detected by a differential detector 138. As described later in the present description, the light beams after being split by the Wollaston prisms 132, 137, respectively, each are an interference beam occurring due to interference between the regeneration beam, and the regeneration reference beam, and outputs of the differential detectors 133, 138, respectively, each are an interference component as extracted. The second interference beam as well is detected by the detection optical system 129 identical in configuration to the detection optical system 128, as is the case with the first interference beam, and interference components, that is, the regeneration beam, and the regeneration reference beam, are detected by the differential detectors 139, 140, respectively.

Figure 8:
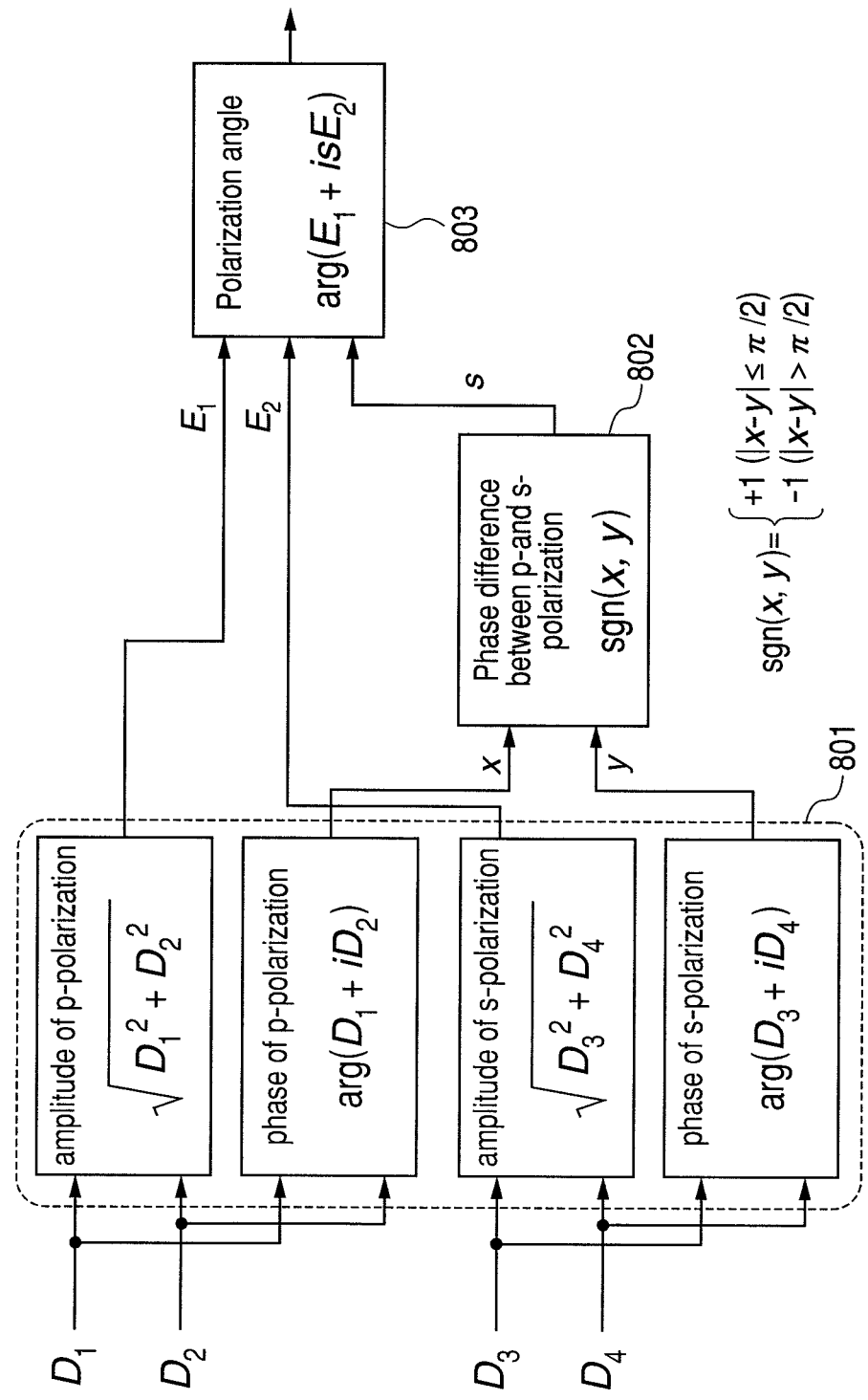
FIG. 8 is a block diagram showing a digital signal processing circuit for regenerating polarization angles of the regeneration beam.

The outputs of the differential detectors 133, 138, 139, 140, respectively, are each sent out to a digital signal processing circuit 141, whereupon the polarization direction (the polarization angle) of the regeneration beam is obtained. FIG. 8 shows a block diagram of the digital signal processing circuit 141. The outputs (designated as $D_1, D_2, D_3, D_4$, respectively) of the differential detectors 133, 138, 139, 140, respectively, are each converted into a digital signal by an A/D converter (not shown) to be subsequently sent out to a complex electric field arithmetic circuit 801 where magnitude of amplitude (as amplified by the regeneration reference beam), and phase (based on the regeneration reference beam), as to the p-polarization component of the regeneration beam, and the s-polarization component of the regeneration beam, respectively, are outputted as operation results. That is, the electric field of the regeneration beam is identified by the operation results. Among these operation results, an operation result of the phase is sent out to a sign-discrimination circuit 802 whereby comparing the p-polarization component with the s-polarization component in respect of magnitude of phase, discrimination is made on whether the p-polarization is identical in phase to the s-polarization component or the p-polarization has a phase opposite in sign from the phase of the s-polarization component, whereupon +1 is outputted in the case of an identical phase, while −1 is outputted in the case of an opposite phase. As a result of this discrimination, it becomes possible to discriminate between ±45° polarizations. Lastly, magnitude of the amplitudes of the p-polarization, and the s-polarization, respectively, and results of discrimination on the phase are sent out to a polarization-angle arithmetic circuit 803, whereupon an angle (a polarization value) of the polarization of the regeneration beam is finally outputted.

The polarization value as obtained is sent out to a decoder 143 to be converted into the user-data before being sent out to a high-level device 144 via the microprocessor 101.

Herein, there is described the principle underlying the regeneration of the polarization modulation signal by use of the detection optical system 128. First, operation of the detection optical system 128 is described. Since the light beam falling on the detection optical system 128 contains the regeneration beam as the p-polarization component, and the regeneration reference beam as the s-polarization component, this polarization state is expressed in terms of Jones vector as follows:

$$\begin{pmatrix} E_{sp} \\ E_r \end{pmatrix} \quad \text{Formula (4)}$$

Herein, $E_{sp}$ refers to the electric field of the p-polarization component of the regeneration beam, and $E_r$ refers to the electric field of the s-polarization component of the regeneration reference beam. Further, the first component of this vector indicates the p-polarization, and the second component thereof indicates the s-polarization. Jones vector after this light beam passes through the non-polarizing beam splitter 130, and the half-wave plate 131 is expressed as follows:

$$\begin{pmatrix} \cos 45° & -\sin 45° \\ \sin 45° & \cos 45° \end{pmatrix} \begin{pmatrix} E_{sp}/\sqrt{2} \\ E_r/\sqrt{2} \end{pmatrix} = \begin{pmatrix} (E_{sp} - E_r)/2 \\ (E_{sp} + E_r)/2 \end{pmatrix} \quad \text{Formula (5)}$$

Subsequently, the light beam is split into the p-polarization component and the s-polarization component by the Wollaston prism 132, and therefore, the electric field of each split light beam is given by the following formula, respectively:

$$\frac{1}{2}(E_{sp} - E_r) \quad \text{Formula (6)}$$

$$\frac{1}{2}(E_{sp} + E_r) \quad \text{Formula (7)}$$

There occurs the regeneration beam superimposed on the regeneration reference beam, that is, an interference beam. On the other hand, Jones vector after a light beam reflected from the non-polarizing beam splitter 130 passes through the quarter-wave plate 136 is expressed as follows:

$$\frac{1}{\sqrt{2}}\begin{pmatrix} i - \cos 90° & \sin 90° \\ \sin 90° & i + \cos 90° \end{pmatrix} \begin{pmatrix} E_{sp}/\sqrt{2} \\ -E_r/\sqrt{2} \end{pmatrix} = \begin{pmatrix} i(E_{sp} + iE_r)/2 \\ (E_{sp} - iE_r)/2 \end{pmatrix} \quad \text{Formula (8)}$$

Subsequently, the light beam is split into the p-polarization component and the s-polarization component by the Wollaston prism 137, and therefore, the electric field of each split light beam is given by the following formula, respectively:

$$\frac{i}{2}(E_{sp} + iE_r) \quad \text{Formula (9)}$$

$$\frac{1}{2}(E_{sp} - iE_r) \quad \text{Formula (10)}$$

There also occurs the regeneration beam superimposed on the regeneration reference beam, that is, an interference beam. Accordingly, four branch beams 145, 146, 147, 148, each have intensity expressed by the following formula, respectively:

$$\left|\frac{1}{2}(E_{sp} - E_r)\right|^2 = \frac{1}{4}|E_{sp}|^2 + \frac{1}{4}|E_r|^2 - \frac{1}{2}|E_{sp}E_r|\cos\Delta\phi_p \quad \text{Formula (11)}$$

$$\left|\frac{1}{2}(E_{sp} + E_r)\right|^2 = \frac{1}{4}|E_{sp}|^2 + \frac{1}{4}|E_r|^2 + \frac{1}{2}|E_{sp}E_r|\cos\Delta\phi_p \quad \text{Formula (12)}$$

$$\left|\frac{i}{2}(E_{sp} + iE_r)\right|^2 = \frac{1}{4}|E_{sp}|^2 + \frac{1}{4}|E_r|^2 + \frac{1}{2}|E_{sp}E_r|\sin\Delta\phi_p \quad \text{Formula (13)}$$

$$\left|\frac{1}{2}(E_{sp} - iE_r)\right|^2 = \frac{1}{4}|E_{sp}|^2 + \frac{1}{4}|E_r|^2 - \frac{1}{2}|E_{sp}E_r|\sin\Delta\phi_p \quad \text{Formula (14)}$$

The first term, and the second term express the intensity component of the regeneration beam, and the intensity component of the regeneration reference beam, respectively, and the third term is a term expressing interference between the regeneration beam and the regeneration reference beam. A symbol $\Delta\phi p$ indicates the phase of a p-component of the regeneration term, based on the phase of the regeneration reference beam. The respective outputs of the differential detectors 133, 138 are proportional to an intensity difference between those branch beams, and therefore, the respective outputs are expressed by the following formula, respectively.

$$D_1 = \eta |E_{sp}E_r|\cos\Delta\phi_p \quad \text{Formula (15)}$$

$$D_2 = \eta |E_{sp}E_r|\sin\Delta\phi_p \quad \text{Formula (16)}$$

Thus, the outputs each are proportional to the term expressing the interference, and $\eta$ indicates the conversion efficiency of the detector.

The polarization state of the second interference beam delivered to the other detection optical system 129 is expressed as follows:

$$\begin{pmatrix} E_r \\ E_{ss} \end{pmatrix} \quad \text{Formula (17)}$$

In this case, $E_r$ refers to the electric field of the p-polarization component of the regeneration reference beam, and $E_{ss}$ refers to the electric field of the s-polarization component of the regeneration beam. Herein, since the regeneration reference beam in the 45-degree polarization state falls on the polarization beam splitter 127, the p-polarization component (phase included) is equal to the s-polarization component, and the electric field of the p-polarization component of the regeneration reference beam is expressed by the same character $E_r$. Since an interference optical system is fully identical in configuration to the detection optical system, the respective outputs of the differential detectors inside the interference optical system are expressed by the following formula, respectively.

$$D_3 = \eta |E_{ss}E_r|\cos\Delta\phi_s \quad \text{Formula (18)}$$

$$D_4 = \eta |E_{ss}E_r|\sin\Delta\phi_s \quad \text{Formula (19)}$$

A sign $\Delta\phi s$ indicates the phase of the s-polarization component of the regeneration term, based on the phase of the regeneration reference beam.

Figure 9:
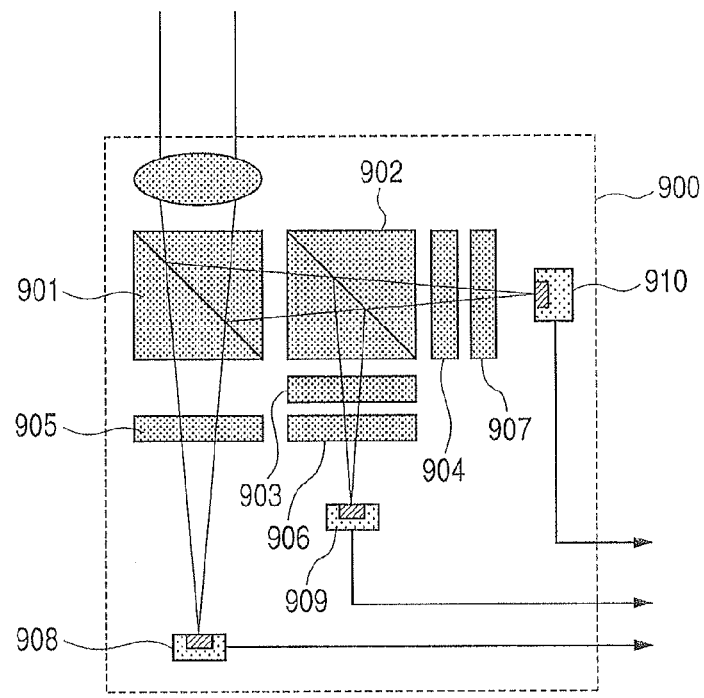
FIG. 9 is a block diagram showing a detection optical system for detecting three interference beams.

Further, in the detection optical system according to the present embodiment, a phase value is estimated on the basis of intensity of each of four interference beams, however, because parameters for deciding the intensity of the interference beam are three parameters including (1) intensity of the signal beam, (2) intensity of the regeneration reference beam, and (3) a phase difference between the signal beam and the regeneration reference beam, if respective intensities of three interference beams, differing in phase from each other, are detected, this will, in theory, enable the phase as well as the intensity of the electric field of the regeneration beam to be estimated in the same way as described above. For example, a detection optical system 900 shown in FIG. 9 is used in place of the detection optical system 128 for detecting the first interference beam. In this case, an incident beam is split into three beams by use of a non-polarizing beam splitters 901, 902, respectively, one beam thereof is caused to pass through a phase plate 903 wherein an s-polarization generates a phase difference of 120 degrees from a p-polarization, and another beam thereof is caused to pass through a phase plate 904 wherein the s-polarization generates a phase difference of 240 degrees from the p-polarization, whereupon either of the three beams passes through polarizers 905, 906, 907, for transmitting only 45° polarization therethrough to be detected by detectors 908, 909, 910. Respective outputs of these detectors are expressed by the following formula, respectively:

$$I_2 = \left|\frac{1}{\sqrt{3}}E_{sp} + \frac{1}{\sqrt{3}}e^{\frac{\pi}{3}i}E_r\right|^2 \quad \text{Formula (20)}$$
$$= \frac{1}{3}|E_{sp}|^2 + \frac{1}{3}|E_r|^2 + \frac{2}{3}|E_{sp}||E_r|\cos\left(\Delta\phi_p - \frac{\pi}{3}\right)$$

$$I_2 = \left|\frac{1}{\sqrt{3}}E_{sp} + \frac{1}{\sqrt{3}}e^{\frac{\pi}{3}i}E_r\right|^2 \quad \text{Formula (21)}$$
$$= \frac{1}{3}|E_{sp}|^2 + \frac{1}{3}|E_r|^2 + \frac{2}{3}|E_{sp}||E_r|\cos\left(\Delta\phi_p - \frac{\pi}{3}\right)$$

$$I_2 = \left|\frac{1}{\sqrt{3}}E_{sp} + \frac{1}{\sqrt{3}}e^{\frac{2\pi}{3}i}E_r\right|^2 \quad \text{Formula (22)}$$
$$= \frac{1}{3}|E_{sp}|^2 + \frac{1}{3}|E_r|^2 + \frac{2}{3}|E_{sp}||E_r|\cos\left(\Delta\phi_p - \frac{2\pi}{3}\right)$$

(the conversion efficiency of the detector is omitted) The following operations are carried out on the basis of these outputs. It is possible to estimate the phase as well as the magnitude of the electric field of the p-polarization component of the regeneration beam:

$$|E_{sp}||E_r| = \sqrt{\left(I_{PD1} - \frac{I_{PD2} + I_{PD3}}{2}\right)^2 + 3\left(\frac{I_{PD2} - I_{PD3}}{2}\right)^2} \quad \text{Formula (23)}$$

$$\Delta\phi_p = \frac{\sqrt{3}(I_2 - I_3)}{2I_1 - I_2 - I_3} \quad \text{Formula (24)}$$

If an operation identical to the above-mentioned is carried out for the second interference beam as well, this can result in identification of complex amplitude of the regeneration beam, so that it is possible to regenerate the polarization angle.

There is described hereinabove an example in which the respective intensities of the three interference beams, differing in phase from each other, are detected, however, the respective intensities of a plurality of interference beams, not less than 3 in numbers, such as 4, 5, and so forth, differing in phase from each other, can be detected by adjusting phase and polarization in such a way as described above.

Now, there is described a possibility that recording•regeneration of the polarization modulation signal higher in the multi-level degree than that in the past (Patent Document 9) can be realized. First, with the present invention, the outputs $D_1$, $D_2$, $D_3$, $D_4$ each are in the form of multiplication of the absolute values of the electric fields of the reference beam. Accordingly, by enhancement of the intensity of the reference beam, an output signal level can be enhanced, and a high SIGNAL-TO-NOISE RATIO for the amplifier noise of the detector can be secured, rendering it possible to discriminate between multi-levels, so that the multi-level degree can be enhanced. Furthermore, with the present method, it is possible to detect the respective phases of the p-polarization of the regeneration beam, and the s-polarization of the regeneration beam, so that discrimination between ±45° polarizations can be realized. Accordingly, discrimination between any linearly polarized light beams is possible, and the polarization modulation range can be expanded twice as large as the conventional polarization modulation range that is limited to the range of from the linearly polarized light beam at 0° to the linearly polarized light beam at 90°, so that the multi-level degree can be, in theory, further enhanced. Further, with the present embodiment, the case of the linearly polarized light beam is described. According to the present embodiment, however, discrimination between light beams in any polarization state can be realized.

Figure 10A:
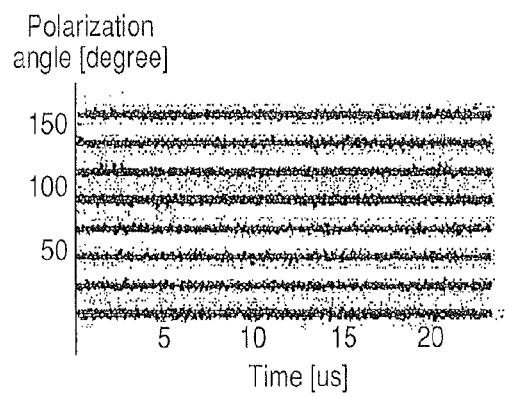
FIG. 10A is a diagram showing simulation results of the regeneration signal for an polarization angle, according to the present embodiment.
Figure 10B:
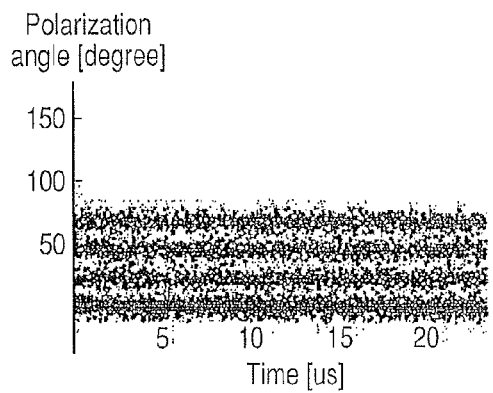
FIG. 10B showing simulation results of a regeneration signal for a polarization angle, according to a conventional technology.

FIG. 10A is a diagram showing simulation results of the regeneration signal according to the present embodiment. In the diagram, the horizontal axis indicates time and the vertical axis indicates the polarization angle of a linearly polarized light beam, as regenerated. The polarization angle regenerated is at values close to eight-different values of polarization angles at 0°, 22.5°, 45°, 67.5°, 90°, 112.5°, 135°, 157.5°, respectively, so that the polarization angles can be correctly regenerated without causing a discrimination error. In contrast, FIG. 10B shows simulation results of a regeneration signal in the case of regenerating the polarization angle of a regeneration beam identical to the regeneration beam according to the present invention by measuring only the intensity of the p-polarization, and the intensity of the s-polarization, as is the case with Patent Document 9. In this case, it is not possible to realize the discrimination between ±45° polarizations as described in the foregoing, so that a regenerated polarization angle is limited to a range of from 0° to 90°. Further, because the regeneration signal is weak, a large error occurs to the regeneration signal, and an identification error occurs to the regenerated polarization angle, thereby rendering it impossible to correctly regenerate the polarization angle. With the method according to the present embodiment, even if the regeneration signal is weak, a signal level can be reinforced by rendering the intensity of the reference larger, so that it is possible to sufficiently suppress noise even though the regeneration signal is weak, as shown in FIG. 10A.

Figure 11:
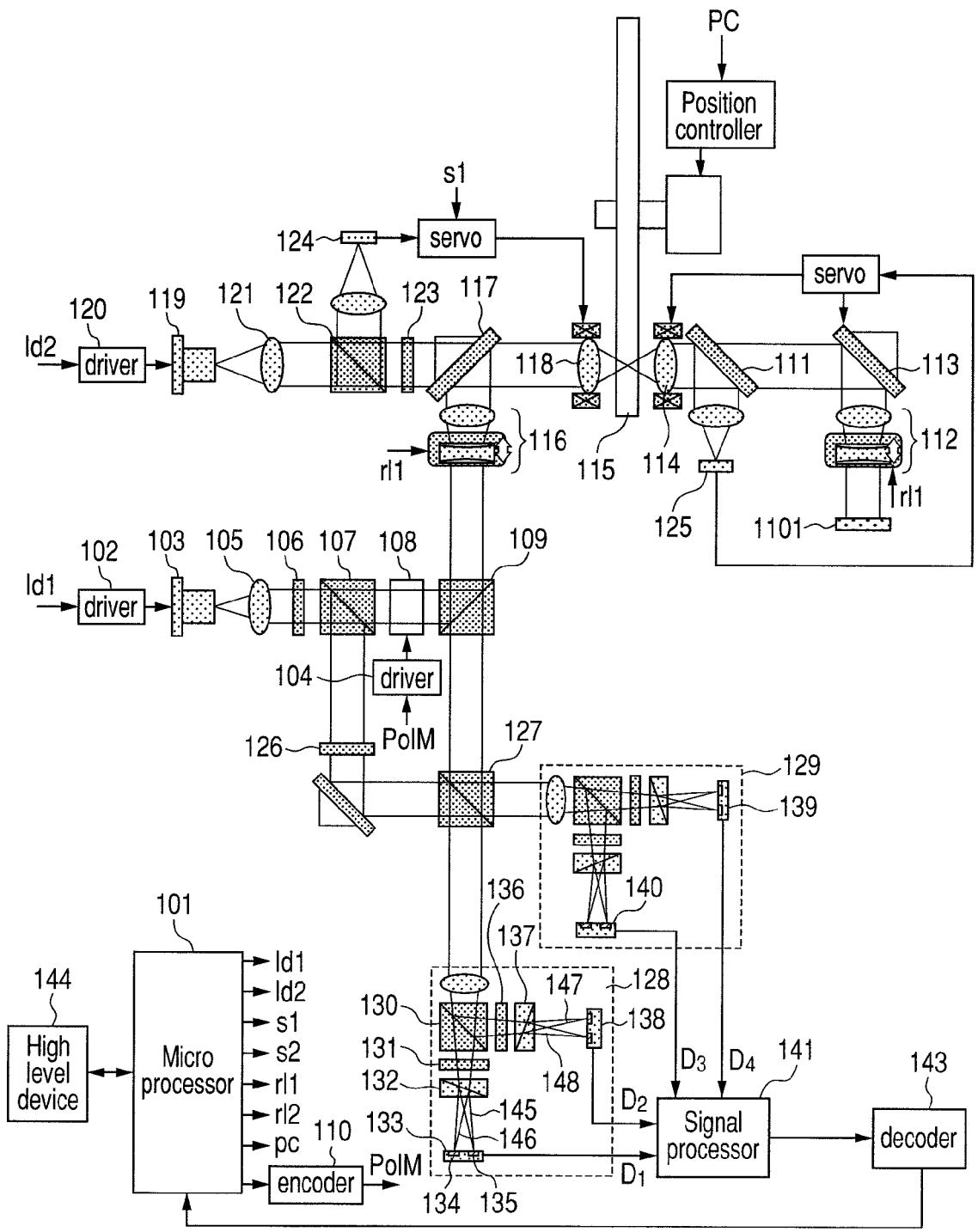
FIG. 11 is a block diagram of an optical device according to another embodiment of the invention, wherein a light beam falling on a recording medium at first is used as a reference beam, and the reference beam transmitted through the recording medium is used as a signal beam.

Further, with the present embodiment, there is adopted a configuration wherein, at the time of recording, the laser beam is split so as to generate the signal beam, and the reference beam, and the signal beam, and the reference beam each fall on the recording medium from respective sides, opposite from each other, however, a method for generating the signal beam, and the reference beam, respectively, and a method for causing the respective beams to fall thereon are not limited thereto. For example, a light beam falling on the recording medium at first may be used as a reference beam, and the reference beam transmitted through the recording medium may be used as a signal beam, as shown in FIG. 11. In this case, the signal beam is reflected by a mirror 1101 to proceed through the same optical path in the opposite direction before falling on the recording medium again to thereby interfere with the reference beam. Further, there may be adopted a configuration wherein the signal beam is rendered coaxial with the reference beam so as to fall on the recording medium from an identical direction, and one of the beams is caused to reflect the other of the beams from the surface of a mirror provided on the rear surface of the recording medium, thereby causing both of the beams to be condensed at focusing points identical to each other from opposite directions, as is the case with Patent Document 8.

With the present embodiment, in order to realize the polarization modulation, a linearly polarized light beam vibrating in an identical direction is adopted for the signal beam, and the reference beam, respectively, however, a modulation method is not limited thereto. For example, by fixing the polarization of the signal beam, and modulating only the polarization of the reference beam, as is the case with Patent Document 9, it is similarly possible to realize recording•regeneration of polarization information. However, the polarization modulation according to the present embodiment is effective in the case where the optical phase modulation amount of the electro-optic element 202 is limited, and so forth, because a polarization rotation amount at the time of recording, for obtaining an identical polarization state at the time of regeneration, is half as much when compared with Patent Document 9.

Figure 31:
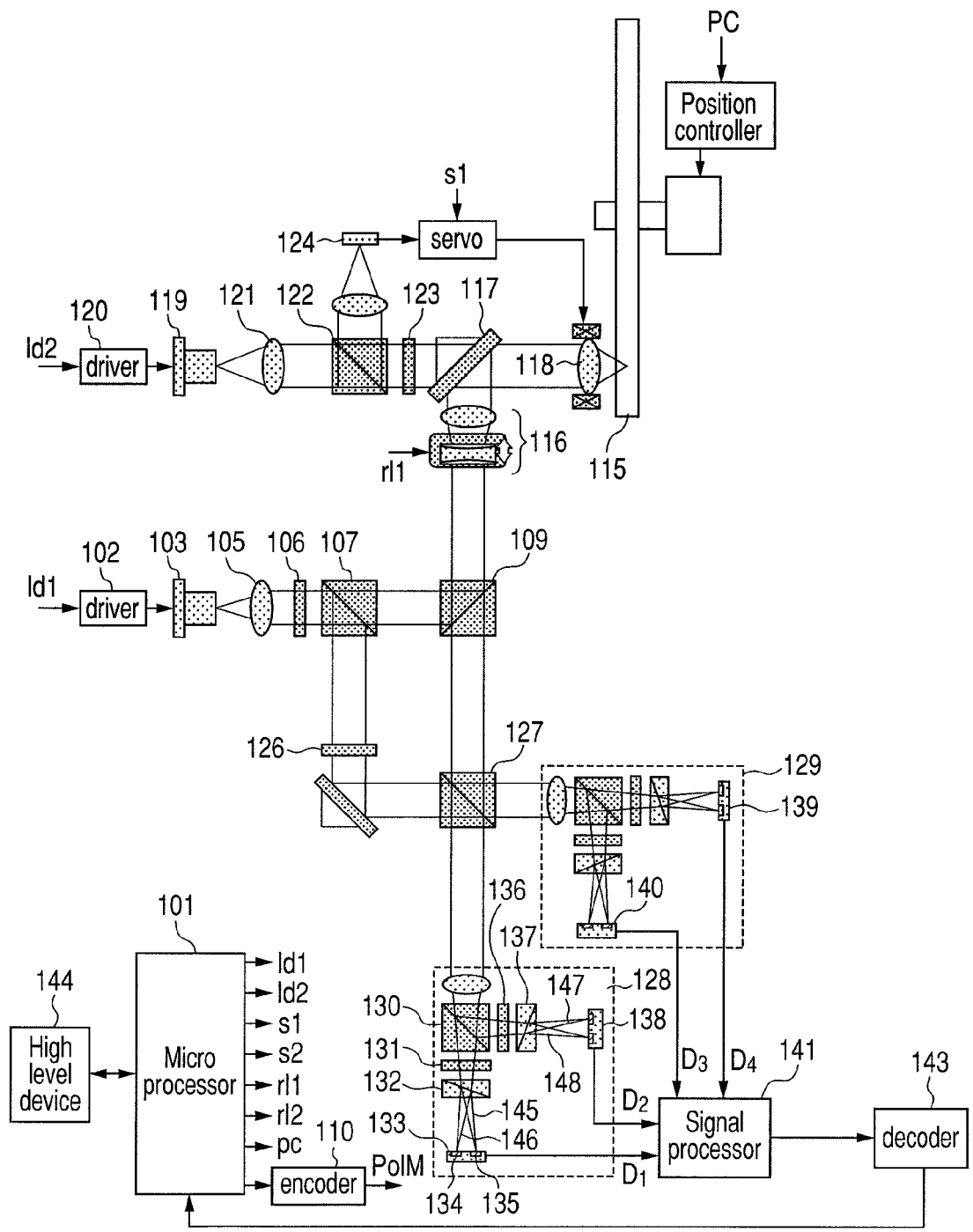
FIG. 31 is a block diagram showing a configuration of reproducing device according to the invention.

Still further, with the present embodiment, either data recording into the recording medium, or data regeneration therefrom can be realized, however, needless to say, reproducing device can be established by making use of a portion of the configuration. More specifically, as shown in FIG. 31, it need only be sufficient to omit constituent elements for use only at the time of recording, such as the polarization modulator 108, the driver 104 thereof, the beam sampler 111, the relay lens 112, the galvano-mirror 113, the objective lens 114, the quadrant detector 125, and so forth, out of the configuration shown in FIG. 1.

Second Embodiment

Figure 12:
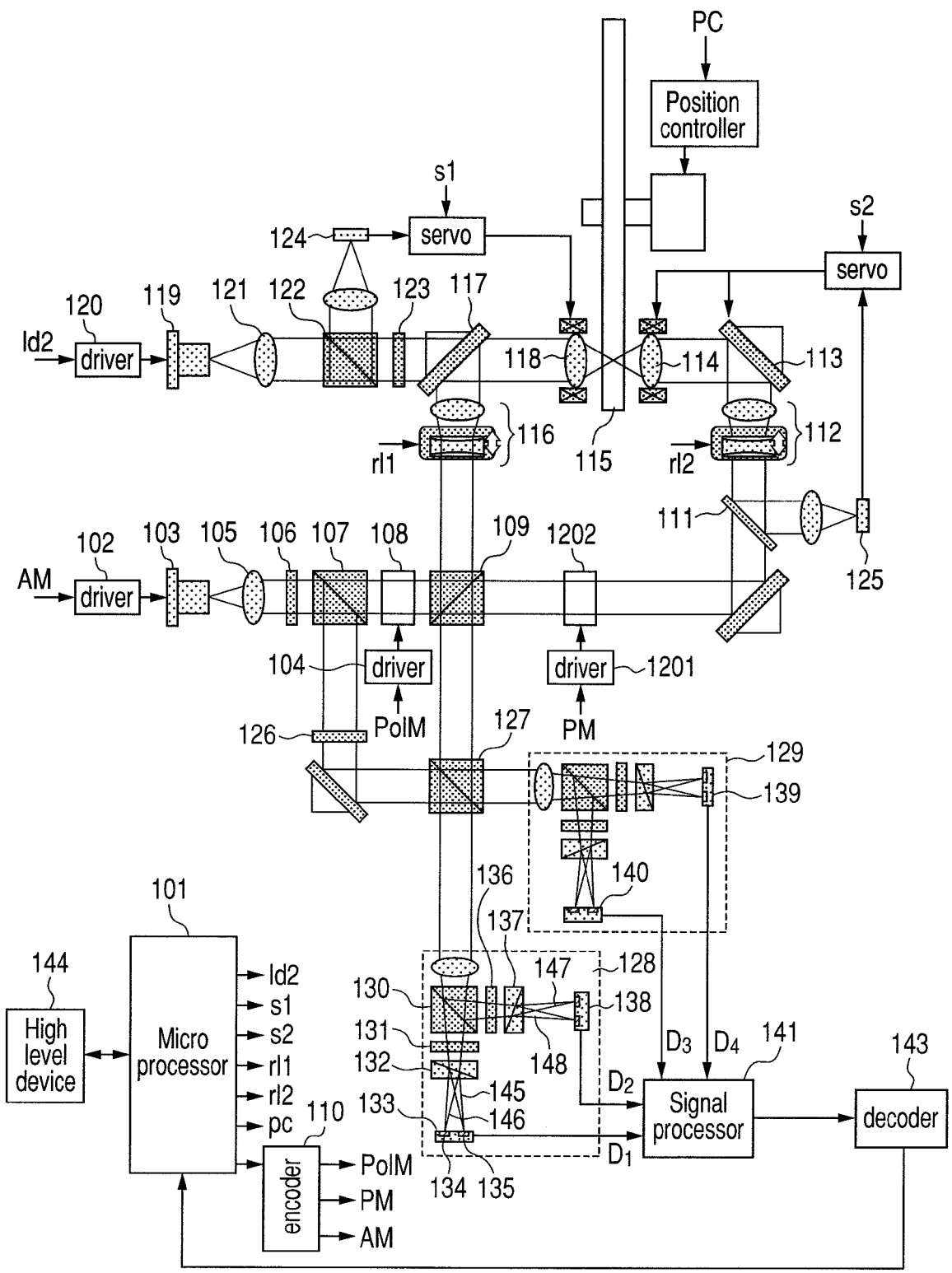
FIG. 12 is a block diagram of an optical device according to a second embodiment of the invention.

With a second embodiment of an optical device according to the invention, it is intended to realize a further increase in multi-level degree by modulating the intensity as well as the phase of the signal beam in addition to the polarization modulation according to the first embodiment of the invention. FIG. 12 is a block diagram showing the device in whole. In this case, at the time of recording, a modulation signal to a driver 102, and an optical phase modulator 1202, respectively, along with a modulation signal to a driver 104 are generated by an encoder 110. At a laser diode 103, modulation of emission intensity according to the modulation signal, is executed by the driver 102, and the optical phase modulator 1202 modulates the phase of a signal beam transmitted therethrough by use of a driver 1201 (since the laser diode 103 carries out pulse emission, as is the case with the first embodiment, magnitudes of the peak intensity of a pulse is modulated). With the present embodiment, intensity modulation of the laser diode 103 is set to an intensity ratio at two values of 1:2, and optical phase modulation of the optical phase modulator 1202 is set at eight-different values of 0, $\pi/4$, $\pi/2$, $3\pi/4$, $\pi$, $5\pi/4$, $3\pi/2$, $7\pi/4$. Further, in optical phase modulation, differential encoding is executed in order to acquire a stable regeneration signal that is described later on. More specifically, a difference between a modulation phase value, and a modulation phase value immediately preceding thereto is designated a recording signal. Otherwise, the present embodiment is basically identical in operation to the first embodiment of the invention.

Figure 13:
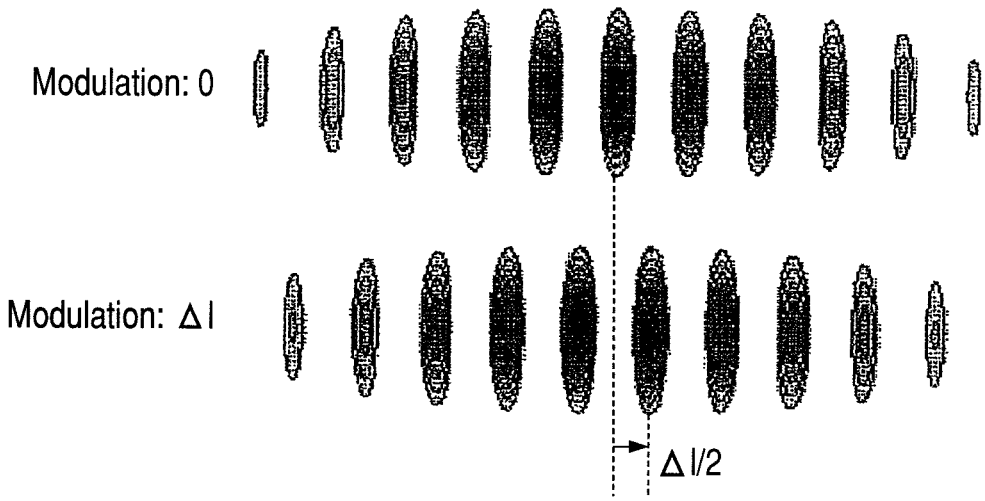
FIG. 13 is a schematic representation for describing a change of a standing wave recorded due to optical phase modulation.
Figure 14:
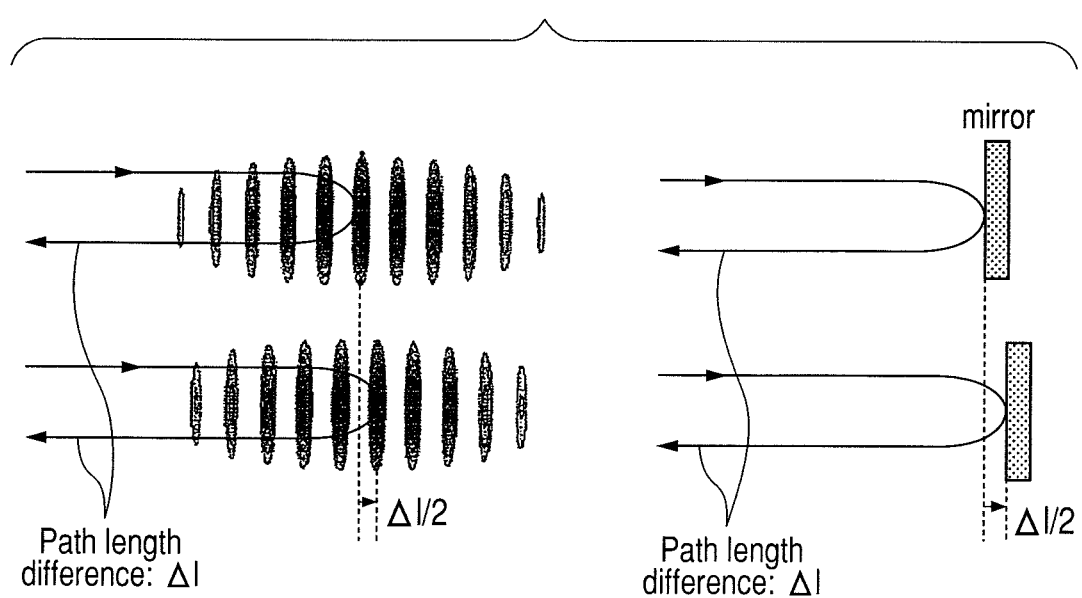
FIG. 14 is a schematic representation for describing a change in phase of a regeneration beam generated from the standing wave recorded due to the optical phase modulation.

The signal beam modulated as above, and a reference beam are condensed on a recording medium 115, as is the case with the first embodiment, and intensity distribution of a standing wave occurring due to interference between the signal beam, and the reference beam is recorded as changes in refractive index. Herein, if the signal beam has undergone optical phase modulation, a modulated phase value is recorded as a change of a position (phase) of constructive interference between the standing waves. FIG. 13 shows a two-dimensional intensity distribution of the standing waves at locations where the signal beam and the reference beam have condensed. In the figure, the horizontal axis indicates a light axis direction of the reference beam as well as the signal beam, the vertical axis a direction (arbitrary) perpendicular to the direction, and the darker in color a region is, the higher in intensity the region is. The intensity distribution in the upper part of FIG. 13 shows the case of optical phase modulation being at 0 while the lower part of FIG. 13 shows the intensity distribution when optical phase modulation is at $2\pi\Delta 1/\lambda$ ($\lambda$ refers to a wavelength of the reference beam as well as the signal beam), that is, the intensity distribution in the case of an optical path being modulated by $\Delta 1$ by the action of the optical phase modulator 1202. As shown in FIG. 13, a position of the standing wave at the peak is shifted by $\Delta\frac{1}{2}$ for optical path length modulation at $\Delta 1$. When a light beam is irradiated to the medium where the intensity distribution described as above is recorded as the changes in refractive index, the optical path length modulation at $\Delta 1$ is applied to a regeneration beam as shown in FIG. 14A in the exactly same way that the light beam is reflected by a mirror whose position in the light axis direction thereof is changed by $\Delta\frac{1}{2}$ as shown in FIG. 14B. Accordingly, a modulated phase at the time of recording is regenerated as the phase of a regeneration beam.

Herein, a point of importance lies in that an optical path length (phase) to be modulated is in a strictly linear relationship with a shift amount of the position of the standing wave at the peak, and proportionality factor thereof is dependent neither on the recording medium, nor on an optical system. In the case of the conventional multi-level recording method described in Patent Document 1, and so forth, a response of the recording medium is nonlinear for the level of the modulation of optical intensity, and so forth, or the proportionality factor thereof is dependent on the recording medium, and the optical system, so that it has been difficult to carry out multi-level recording with high precision. In contrast, with the method according to the present invention, a modulation amount can be reflected in a recording state with extremely high precision as described above, thereby enabling simple, and highly accurate recording to be realized, so that a multi-level degree can be enhanced with ease.

There is shown an example in which the optical phase modulation is executed at the eight-different values as above, however, it goes without saying that the invention is not limited thereto.

Further, since the intensity distribution of the standing waves undergoes a uniform change in proportion to the intensity of the laser diode 103, the intensity modulation is recorded as magnitude of the changes in refractive index. The intensity modulation is therefore regenerated as the intensity of the regeneration beam at the time of regeneration.

Figure 15:
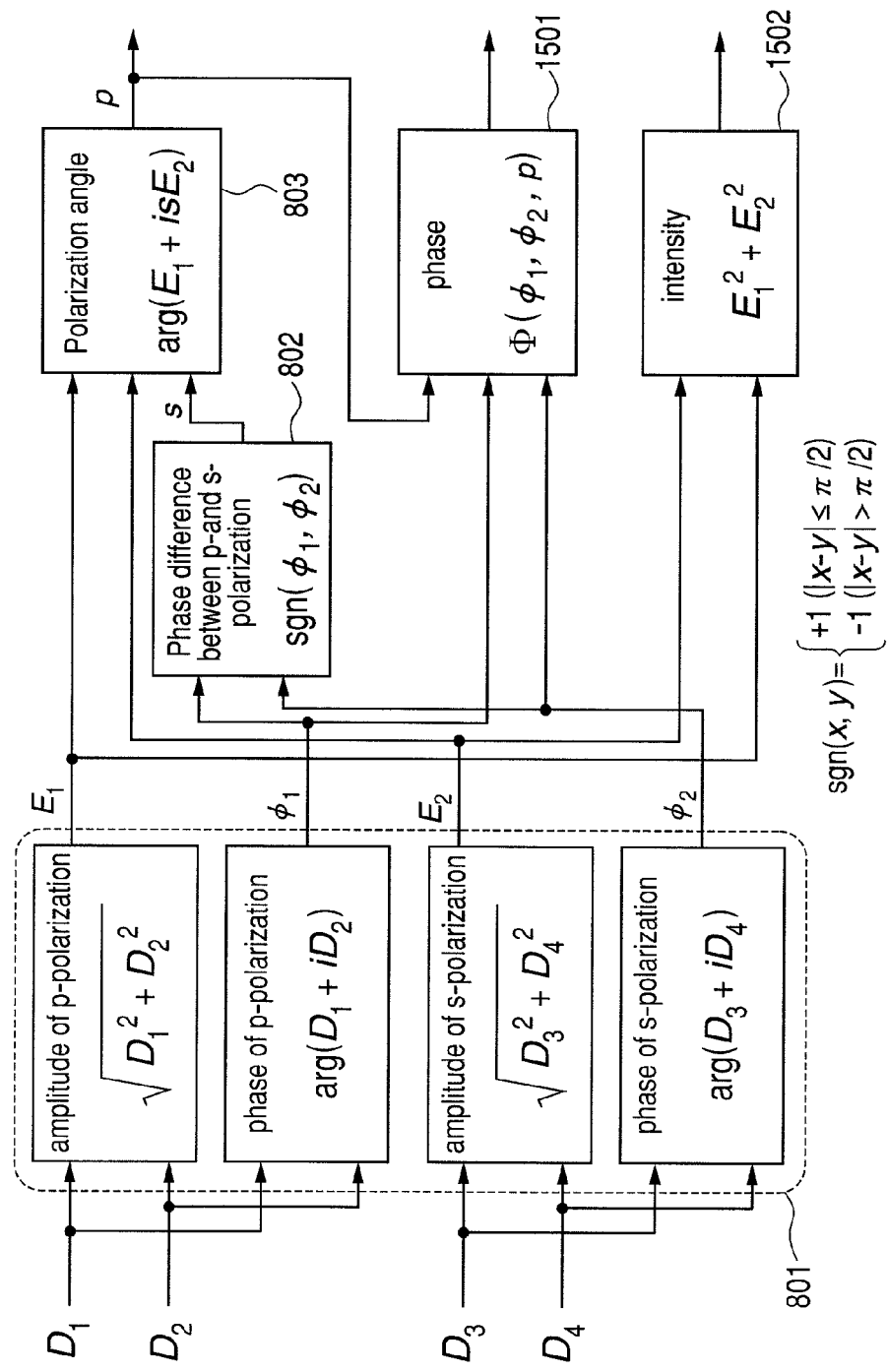
FIG. 15 a block diagram of a digital signal processing circuit for regenerating a polarization angle, a phase value, and intensity value.

Next, operation at the time of regeneration is described hereinafter. The operation up until generation of four differential signals $D_1, D_2, D_3, D_4$ by detection optical systems 128, 129, respectively, is identical to the operation according to the first embodiment. FIG. 15 shows a block diagram of a digital signal processing circuit 141 according to the present embodiment. Since the electric field of the regeneration beam is identified by a complex electric field arithmetic circuit 801, as is the case with the first embodiment, it is possible to estimate not only a polarization angle but also phase, and intensity. As for a phase value, an estimated value thereof is outputted by a phase estimation circuit 1501 according to Table 1 given hereunder, on the basis of the respective phase values $\phi 1, \phi 2$ of the p-polarization, and the s-polarization, and an estimated value p of the polarization angle:

TABLE 1

| Condition (unit of p: radian) | Output |
|---|---|
| $P < \pi/16$ or $p \geq 15\pi/16$ | $\phi 1$ |
| $\pi/16 \leq p < 3\pi/16$ | $\phi 1$ |
| $3\pi/16 \leq p < 5\pi/16$ | $\phi 1$ |
| $5\pi/16 \leq p < 7\pi/16$ | $\phi 2$ |
| $7\pi/16 \leq p < 9\pi/16$ | $\phi 2$ |
| $9\pi/16 \leq p < 11\pi/16$ | $-\phi 2$ |
| $11\pi/16 \leq p < 13\pi/16$ | $-\phi 1$ |
| $13\pi/16 \leq p < 15\pi/16$ | $-\phi 1$ |

Further, an intensity value is obtained as the sum of the square of an amplitude magnitude of the p-polarization, and the square of an amplitude magnitude of the s-polarization, outputted from an intensity estimation circuit 1502.

The outputs of a digital signal processing circuit 141 are sent out to a decoder 143, and user data is decoded from the polarization angle, the phase value, and the intensity value that are obtained at the digital signal processing circuit 141. Herein, the phase value is decoded on the basis of a difference from an estimated phase value immediately proceeding thereto. The user data outputted is sent out to a high-level device 144 via a microprocessor 101.

Now, the differential encoding is described in detail hereinafter. The phase value $\phi$ obtained by the digital signal processing circuit contains, in reality, components other than a modulation phase, and is accurately expressed by the following formula:

$$\Phi = \phi_s + \phi_{r1} + \phi_{r2} \qquad \text{Formula (25)}$$

Herein, $\phi_s$ designates a phase modulated by the optical phase modulator, $\phi_{r1}$ a phase difference corresponding to an optical path length difference (excluding an optical phase modulation portion) between the signal beam, and the reference beam at a point in time when recorded, and $\phi_{r2}$ a phase difference corresponding to the optical path length difference (excluding the optical phase modulation portion) between the signal beam, and the reference beam at a point in time when regenerated. The phase differences $\phi_{r1}$ and $\phi_{r2}$ each occur mainly due to surface fluctuation (deviation on, the order of 100 μm, in the direction of an optical axis) of the recording medium at the time of recording, and at the time of regeneration. And those phase differences undergo variation with time. However, with the present invention, data is written at a speed of from several MHz to several 100 MHz while the speed of the surface fluctuation is in a range of several KHz to several 100 KHz, so that $\phi_{r1}$ and $\phi_{r2}$ are substantially constant between write-positions (symbols) adjacent to each other. Accordingly, if a difference between the symbols adjacent to each other is a decoding signal, a signal can be regenerated without being affected by the unnecessary phase components $\phi_{r1}$ and $\phi_{r2}$.

Figure 30:
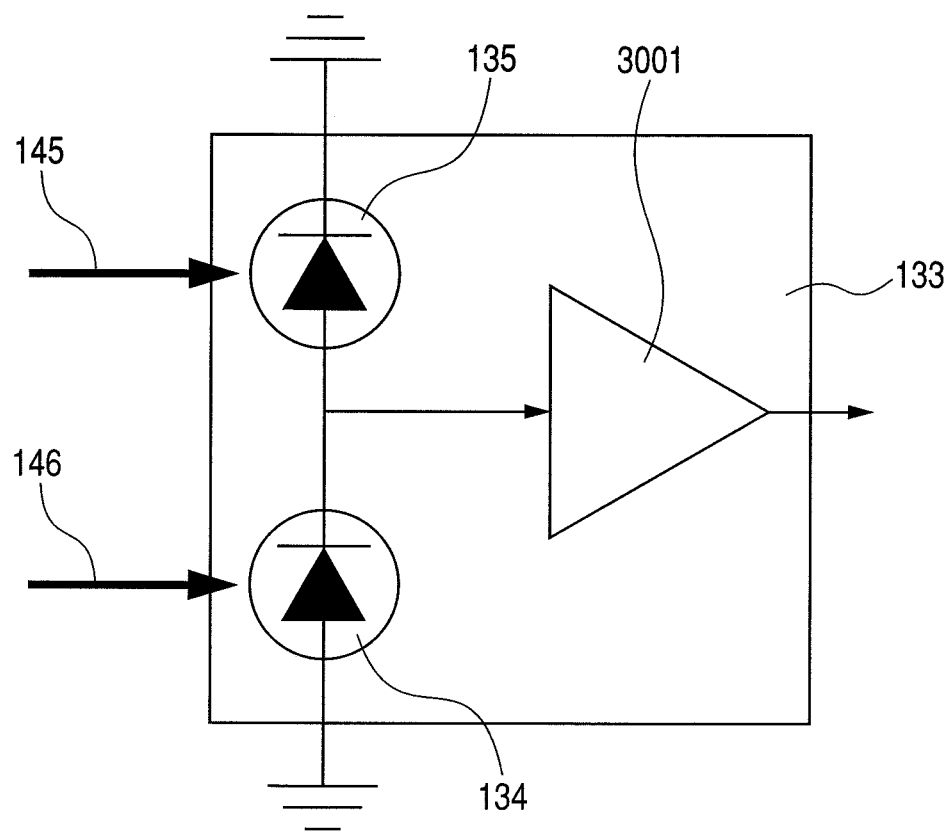
FIG. 30 is a block diagram of a differential detector according to the invention.

Now, there is described hereinafter a reason why a high SIGNAL-TO-NOISE RATIO as compared with a conventional SIGNAL-TO-NOISE RATIO can be obtained when a phase detection method according to the present invention is adopted. With an optical information recording device, the noise of a regeneration signal is generally classified into a laser noise, a disc noise, a detector noise (amplifier noise), and a shot noise (in the case of a holographic memory for storing page data, a scattered beam noise in addition to those noises will pose a problem). In the case of most of the conventional technologies using the technology described in Patent Document 1, and a commercial optical disk such as CD, DVD, and so forth, a change in optical intensity reflected from a recording medium at the time of regeneration is read as a signal. For this reason, the laser noise due to fluctuation in emission intensity of a light source is added to noises, thereby causing deterioration in the SIGNAL-TO-NOISE RATIO. Further, as previously described with reference to Patent Document 7, the laser noise causes an error to occur to the phase value at a time when the phase value is obtained from the four outputs. In contrast, with the present embodiment, the regeneration signal obtained for the phase value is an output having no relation with the intensity of the light source, so that the regeneration signal is not affected by the laser noise. In this case, a point of importance lies in that the four branch beams are generated at the same time and the outputs of the differential detector are concurrently (time-wise) obtained. In so doing, even if the regeneration beam and the regeneration reference beam undergo variation in intensity, the branch beams will undergo uniform variation, so that the variations in intensity will always cancel each other out in an operation for outputting the phase value, whereupon the output not affected by the laser noise is obtained. Then, the disc noise represents fluctuation in reflectance of the recording medium, and in the case of a method for reading a change in intensity of light reflected from the recording medium as a signal, the disc noise will be a fluctuation component, as is the case with the laser noise. With the present invention, however, the fluctuation component is cancelled, as is the case with the laser noise, so that the effect of the disc noise is suppressed. The detector noise is an intrinsic noise of a detector irrespective of a light beam to be detected, posing a problem when an amount of light to be detected is small for the reason of low reflectance of the recording medium. In contrast, with the present invention, the effect of the detector noise can be suppressed by sufficiently increasing an amount of the regeneration reference beam. This is because the detector noise emerges in the form of an addition onto the output signal of the differential detector, however, since magnitude of the output signal of the differential detector (excluding the detector noise) is proportional to the absolute value of the electric field of the regeneration reference beam, the magnitude of the detector noise can be relatively decreased by increasing the intensity of the regeneration reference beam. Further with the present embodiment, the differential detector is of a current-differential type configuration wherein a difference between photocurrents, caused by the respective branch beams falling on the two photodiodes, undergoes current•voltage conversion by a trans-impedance amplifier 3001, as shown in FIG. 30. With the adoption of the present configuration, even if the intensity of the regeneration reference beam is enhanced in order to obtain a sufficient output level, the respective photocurrents according to the intensity of the regeneration reference beam itself, at the two photodiodes, are equal to each other, and cancel each other out, so that no saturation occurs to the trans-impedance amplifier, and a sufficient output-signal level can be obtained, thereby enabling relative magnitude of the amplifier noise to be effectively suppressed. Further, with the configuration of the differential detector described as above, since one unit of the trans-impedance amplifier is provided for the two photodiodes, if an operation is carried out by use of four outputs after the current•voltage conversion of the respective photocurrents of the photodiodes, by the trans-impedance amplifier, as in the case of a common detector, the detector noise can be reduced by 3 dB. In this respect as well, the configuration is effective for suppression of the amplifier noise.

Thus, a regeneration method according to the present embodiment has a satisfactory effect of suppression for the noises except the shot noise that is theoretically difficult to remove, and considerable improvement in the SIGNAL-TO-NOISE RATIO can be realized, so that it becomes possible to considerably enhance the multi-level degree, and to dramatically enhance a transfer rate as well as the capacity of recording data in the recording medium.

Figure 16:
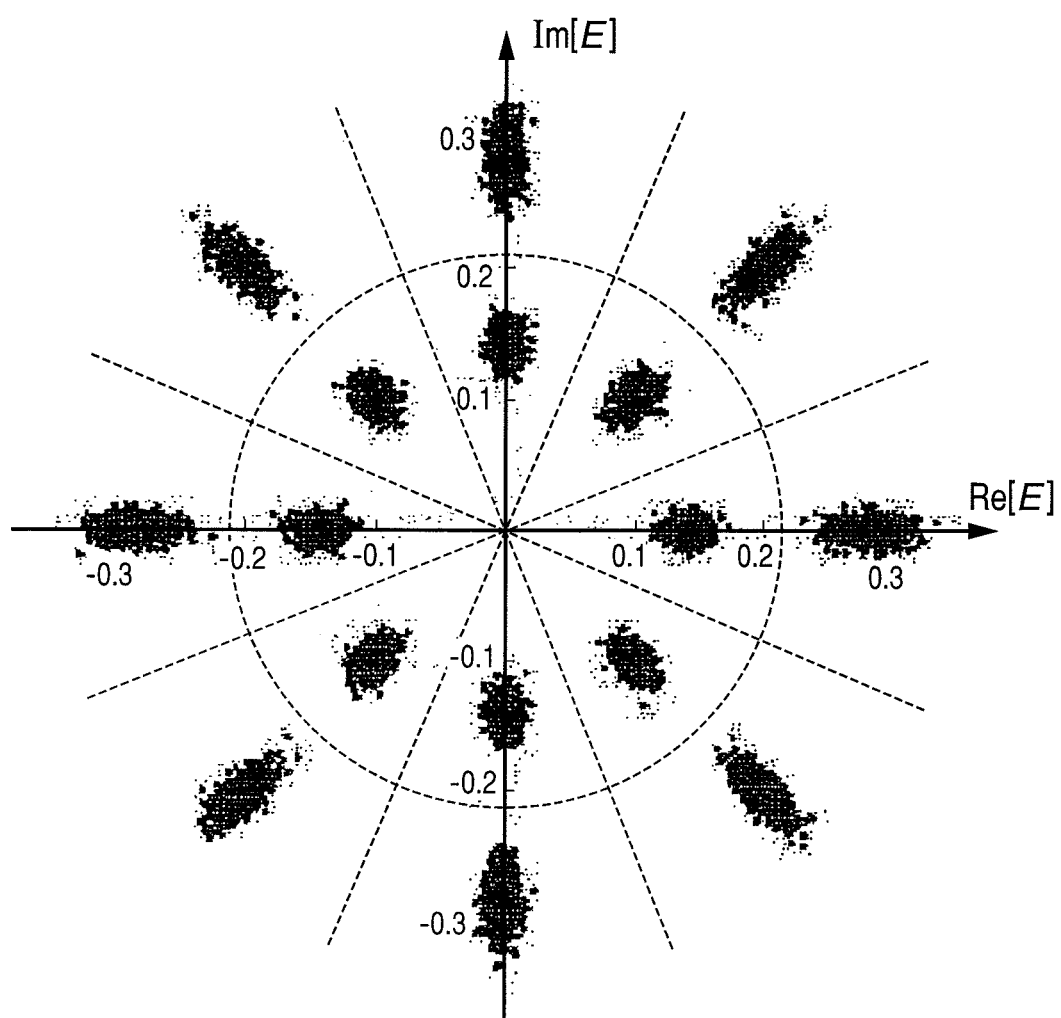
FIG. 16 is a schematic representation showing simulation results of regeneration signals for optical phase modulation, and intensity modulation, respectively.

FIG. 16 shows simulation results of the regeneration signals for the phase value, and the intensity value, respectively, according to the present embodiment. In the figure, optical electric fields regenerated in a complex plane state are placed as signal points, and the absolute values of the respective points are the square roots of the intensity value while an angle of deviation is the phase value. It is evident that the modulation signal at any of the signal points is demodulated with excellent precision, and the regeneration signal can be accurately obtained. Further, the polarization angle as shown in FIGS. 10A, 10B, together with the phase value, and the intensity value, is concurrently regenerated.

With the present embodiment, phase, and intensity, in addition to a polarization angle, are concurrently modulated, however, only either of optical phase modulation and intensity modulation may be executed. Further, there may be a correlation between an optical phase modulation value, and an intensity modulation value, and as in the case of, for example, QAM (Quadrature Amplitude Modulation), modulation may be one whereby electric-field complex-amplitude to be modulated is placed in a lattice-point like state on a complex plane. QAM represents a method whereby a real part component of the electric-field complex-amplitude, and an imaginary part component thereof are modulated independently from each other, however, it can be taken as phase intensity modulation wherein a correlation exists between the optical phase modulation value, and the intensity modulation value.

With the present embodiment as well, a reproducing device can be established by making use of a portion of the configuration as in the case of the first embodiment. More specifically, as shown in FIG. 31, it need only be sufficient to omit constituent elements for use only at the time of recording, such as the polarization modulator 108, the driver 104 thereof, the beam sampler 111, the relay lens 112, the galvano-mirror 113, the objective lens 114, the quadrant detector 125, and so forth, out of the configuration shown in FIG. 1.

Third Embodiment

Figure 17:
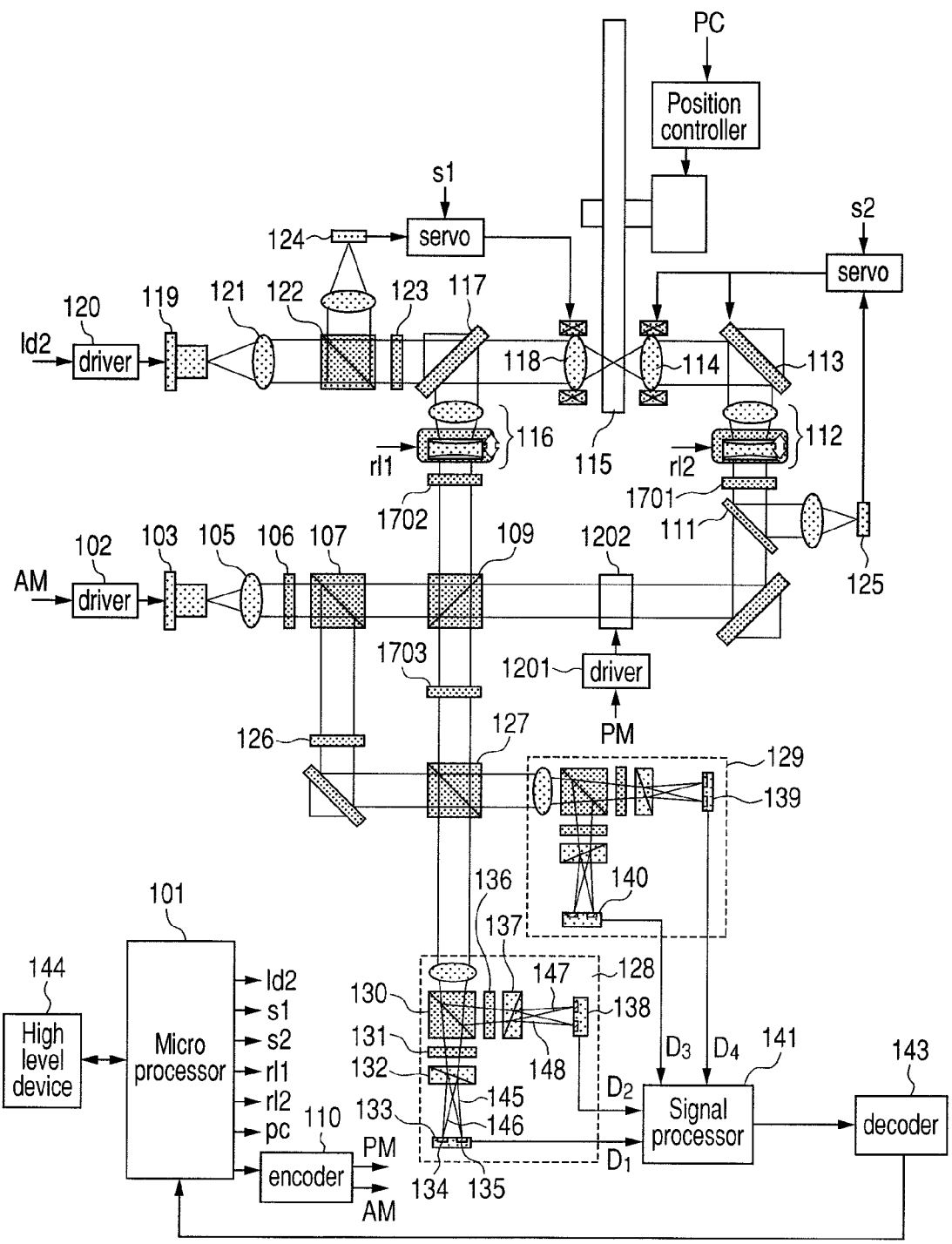
FIG. 17 is a block diagram of an optical device according to a third embodiment of the invention.

With a third embodiment of an optical device according to the invention, it is intended to realize multiplex recording by varying the polarization state in two different ways at the time of recording. FIG. 17 is a block diagram showing the device according to the present embodiment. First, there is described operation at the time of recording. The operation is basically identical to that in the case of the second embodiment; however, it differs in that polarization modulation for signal modulation is not executed, and only intensity modulation as well as optical phase modulation, is executed. Herein, setting is made such that, by use quarter-wave plates 1701, 1702, having an axial orientation at 45°, respectively, the polarization state of a signal beam, and the polarization state of a reference beam are each turned into right-handed circularly polarized light, and left-handed circularly polarized light, respectively, as seen from the travelling direction of a light beam before falling on a recording medium 115. In this polarization state, an interference beam occurring between the signal beam, and the reference beam is recorded on the recording medium, as is the case with the first embodiment and the second embodiment (this operation is hereinafter referred to as a first recording). Thereafter, the axial orientation of each of the quarter-wave plates 1701, 1702 is varied by 90°, thereby turning the polarization state of the signal beam condensed on the recording medium, and the polarization state of the reference beam condensed on the recording medium into the left-handed circularly polarized light, and the right-handed circularly polarized light, respectively, (as seen from the travelling direction of the light beam). In this polarization state, an interference beam between the signal beam, and the reference beam is recorded on the recording medium again (this operation is hereinafter referred to as a second recording). At this point in time, recording is made again at a location identical to a location where recording has been made upon setting of a first polarization. That is, multiplex recording is executed.

Figure 18:
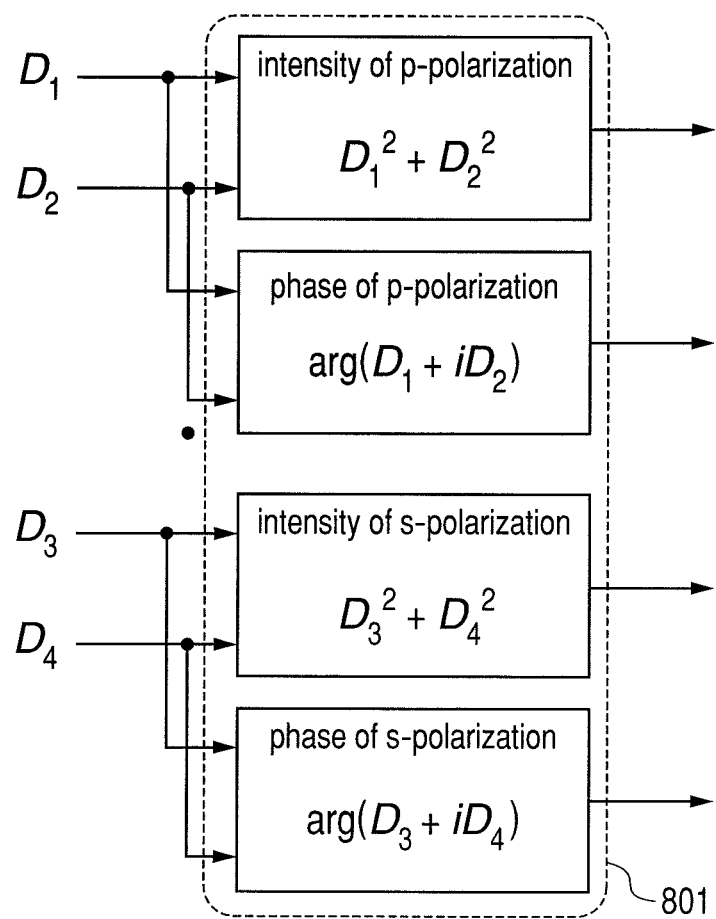
FIG. 18 is a block diagram showing a digital signal processing circuit for regenerating phase•intensity modulation signals subjected to multiplex recording.

In an operation at the time of regeneration, a light beam is irradiated to the recording medium from the optical path of either the signal beam, or the reference beam, and a reflection beam is detected by detection optical systems 128, 129, respectively (with the present embodiment, use is made of the optical path of the reference beam), as is the case with the first embodiment and the second embodiment. Herein, the axial orientation of the quarter-wave plate 1702 is set at 0°, thereby causing a p-polarized light (that is, the right-handed circularly polarized light superimposed on the left-handed circularly polarized light) to be irradiated to the recording medium. Then, a right-handed circularly polarized light component of an irradiated beam is reflected according to interference fringes as recorded at the first recording, thereby generating a regeneration beam of the right-handed circularly polarized light. Similarly, a left-handed circularly polarized component of the irradiated beam is reflected according to interference fringes as recorded at the second recording, thereby generating a regeneration beam of the left-handed circularly polarized light. The regeneration beam of the right-handed circularly polarized light is turned coaxial with the regeneration beam of the left-handed circularly polarized light and these regeneration beams proceed through the optical path of the irradiated beam in a direction opposed to the direction of the irradiated beam. Now, since those regeneration beams pass through the quarter-wave plate 1702, the right-handed circularly polarized light is turned into a linearly polarized light beam at +45°, and the left-handed circularly polarized light is turned into a linearly polarized light beam at −45°. Further, those regeneration beams pass through a half-wave plate 1703 having an axial orientation at 22.5° immediately before falling on a polarization beam splitter 127, whereupon one of the regeneration beams, which was a right-handed circularly polarized light component at a point in time when emitted from the recording medium 115, is converted into a p-polarized light beam while the other of the regeneration beams, which was a left-handed circularly polarized light component at the point in time when emitted from the recording medium 115, is converted into an s-polarized light beam, and subsequently, the p-polarized light beam, and the s-polarized light beam fall on the polarization beam splitter 127. Thereafter, the regeneration beam is combined with the reference beam of the linearly polarized light beam at +45°, as is the case with the first embodiment and the second embodiment, and signals $D_1, D_2, D_3, D_4$ are outputted by detection optical systems 128, 129, respectively. Herein, since the p-polarization component of the regeneration beam is guided to the detection optical system 128, and the s-polarization component thereof is guided to the detection optical system 129, as shown in FIG. 7, the signals $D_1, D_2$ each represent the signal recorded at the first recording, as modulated, and the signals $D_3, D_4$ each similarly represent the signal recorded at the second recording, as modulated. These output signals are sent out to a digital signal processing circuit 141. FIG. 18 is a block diagram showing the digital signal processing circuit 141, an intensity value and a phase value, recorded at the first recording, are estimated from $D_1, D_2$, respectively, and similarly, an intensity value and a phase value, recorded at the second recording, are estimated from $D_3, D_4$, respectively. On the basis of these estimated values, user-data is decoded by a decoder 143.

Figure 19:
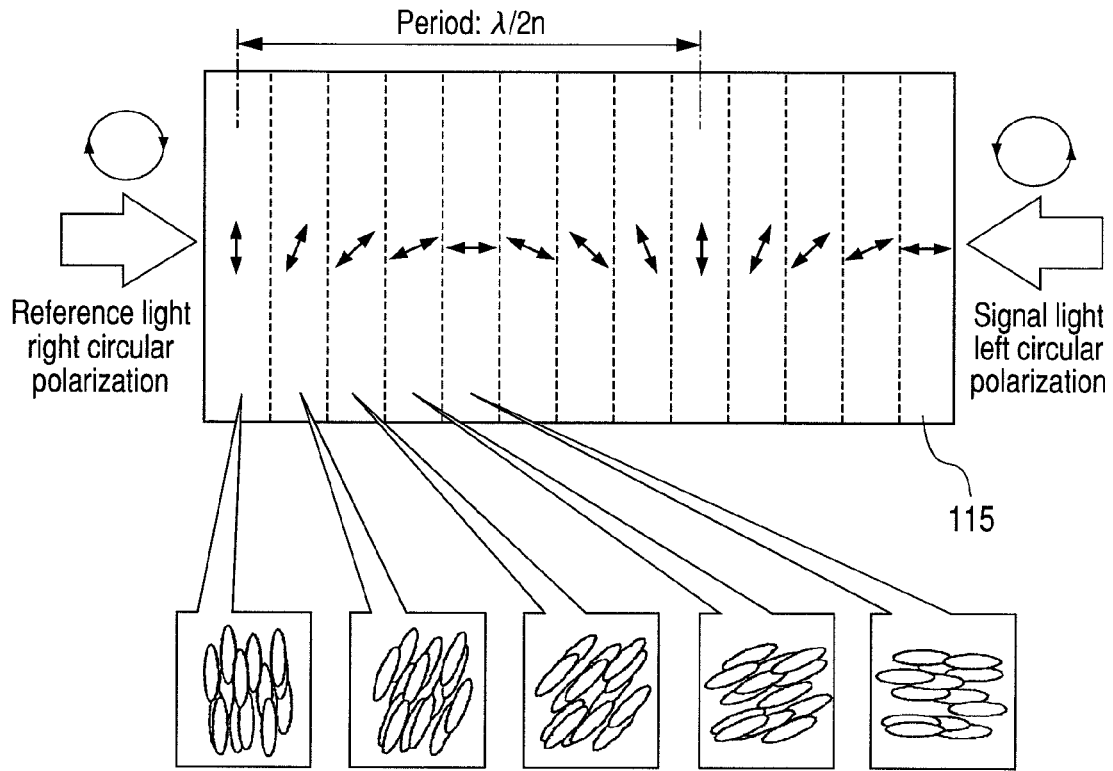
FIG. 19 is a schematic representation for describing the principle underlying recording by a standing wave generated by the agency of the signal beam in a circularly polarized light state, and the reference beam in a circularly polarized light state.

Now, there is described hereinafter the principle underlying the multiplex recording, and the regeneration. Suppose we consider the case of the first recording by way of example. In contrast to the case of the first embodiment or the second embodiment, a standing wave by the agency of the signal beam, and the reference beam, in the recording medium, has the same magnitude of amplitude at any location in the light axis direction, and a vibration direction of the standing wave undergoes successive changes depending on a position thereof, in the light axis direction, as shown in FIG. 19 (in the figure, an arrow for indicating a vibration direction, in realty, indicates, a direction of vibration in a plane perpendicular to the optical axis). Following this, the orientation of the respective azobenzene molecules in the recording medium undergoes successive changes depending on a position thereof, in the light axis direction, and a vibration period will be $\lambda/2n$ ($\lambda$ designates a wavelength of the signal beam, and a wavelength of the reference beam, respectively, and n designates an average refractive index of the recording medium 115). This structure is quite identical to the structure of a cholesteric liquid crystal wherein the orientation of a liquid crystal molecule undergoes a spiral change. The cholesteric liquid crystal is known to have a property such that when a light beam whose wavelength is twice as long as a spiral pitch falls thereon, in the case of circularly polarized light, rotating in a direction opposite from a spiral direction, there occur reflection beams identical in polarization state to each other, while in the case of circularly polarized light, rotating in a direction identical to the spiral direction, nearly 100% of the circularly polarized light is transmitted therethrough (refer to, for example, "Liquid Crystal", by S. C. Handrasekhaar, published by Cambridge University Press, 1977, pp. 214-224). Accordingly, with the present invention, the recording medium where recording has been made exhibits the same property as described above, so that if a linearly polarized light beam falls on the recording medium from a direction in which the reference beam has fallen on, this will cause the reflection beam of the right-handed circularly polarized light in response to a standing wave where only the right-handed circularly polarized light component of the linearly polarized light beam is recorded while nearly 100% of the left-handed circularly polarized light is transmitted therethrough without generating the reflection beam. When the second recording is executed, there occurs the orientation of the respective azobenzene molecules, equivalent to a cholesteric liquid crystal wherein a spiral direction is reversed this time. Owing to this orientation, the left-handed circularly polarized light is selectively reflected this time, however, reflection of the right-handed circularly polarized light, owing to this orientation, will not occur. In consequence, when the linearly polarized light beam is irradiated to the recording medium after the execution of the first and second recordings, there reflected the right-handed circularly polarized light component in response to the first recording and the left-handed circularly polarized light component in response to the second recording while the respective polarization states thereof are maintained. Further, because intensity modulation at the time of recording corresponds to the number of the azobenzene molecules in as-oriented state, it is modulated as magnitude of reflectance at the time of regeneration. Further, because optical phase modulation at the time of recording is recorded as positions in the light axis direction of a spiral structure described as above, it is regenerated as the phase change of the regeneration beam, just as is the case with the second embodiment.

Figure 20A:
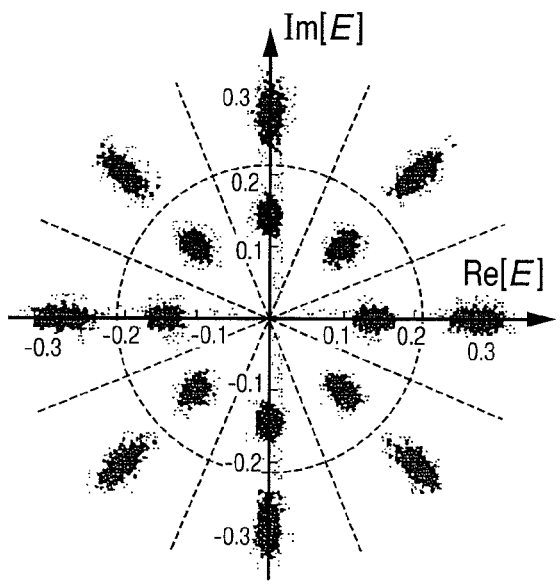
FIG. 20A and FIG. 20B each are is a schematic representation showing simulation results of regeneration signals for multiplex-recorded optical phase modulation and multiplex-recorded intensity modulation, respectively.
Figure 20B:
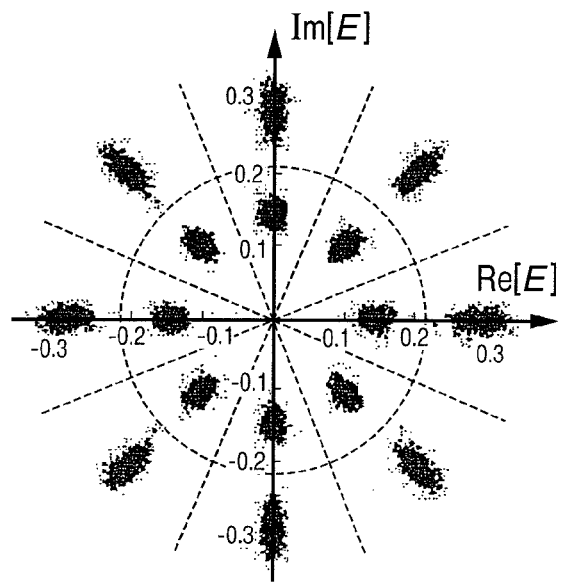

FIGS. 20A, 20B each show simulation results of the regeneration signals according to the present embodiment. FIG. 20A shows complex-amplitudes (corresponding to the first recording) of the respective electric-fields obtained from outputs from $D_1, D_2$, respectively, and FIG. 20B shows complex-amplitudes (corresponding to the second recording) of the respective electric-fields obtained from outputs from $D_3, D_4$, respectively. With the respective complex-amplitudes, values close to the modulation state are obtained, and the discrimination error is hardly found, which demonstrate that the first and second recordings are able to split a multiplexed signal to thereby execute regeneration.

With the present embodiment, the right-handed circularly polarized light, and the left-handed circularly polarized light are dealt with as the polarization states of the signal beam, and the reference beam, respectively, in the multiplex recording, however, applicable polarization states are not limited thereto. For example, as in the case of Patent Document 9, polarization of the signal beam may be varied into the p-polarization state and the s-polarization state while polarization of the reference beam is fixed in the s-polarization state, thereby executing the multiplex recording. If polarization directions of the regeneration beams generated from two kinds of standing waves having undergone multiplex recording at the time of regeneration are orthogonal to each other, information recorded in the respective standing waves can be split to be regenerated, as is the case with the present embodiment.

With the present embodiment, as for the signal modulation at the time of recording, the modulation of either optical phase modulation, or intensity modulation may be executed, and there may be adopted a modulation method such as QAM wherein there exists a correlation between the optical phase modulation value, and the intensity modulation value, as is the case with the second embodiment.

With the present embodiment as well, a reproducing device can be established by making use of a portion of the configuration as in the case of the first embodiment. More specifically, it need only be sufficient to omit constituent elements for use only at the time of recording, such as the optical phase modulator 1202, the driver 1201 thereof, the beam sampler 111, the quarter-wave plate 1701, the relay lens 112, the galvano-mirror 113, the objective lens 114, the quadrant detector 125, and so forth, out of the configuration shown in FIG. 17.

[Non-Patent Document 2]
"Liquid Crystal", written by S. Chandrasekhar and published by Cambridge University Press, 1977, pp. 214-224

Fourth Embodiment

Figure 21:
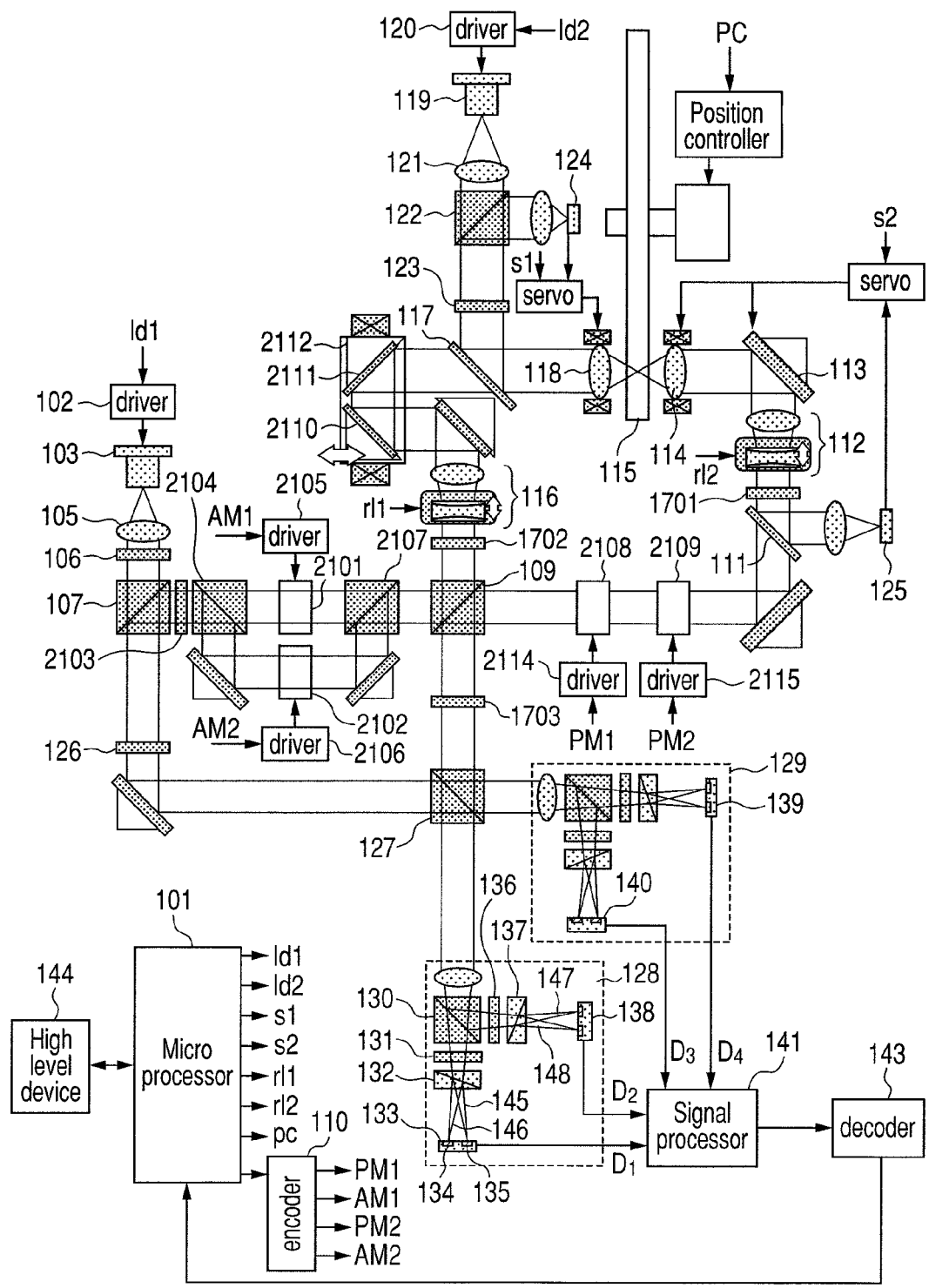
FIG. 21 is a block diagram of an optical device according to a fourth embodiment of the invention.

A fourth embodiment of an optical device according to the invention is a variation of the third embodiment, for concurrently realizing the first recording and the second recording executed in the case of the third embodiment. FIG. 21 is a block diagram showing the device according to the present embodiment. In this case, in order to cause intensity modulators 2101, 2102 to execute intensity modulation, a laser diode 103 emit pulses at a constant peak intensity. A light beam reflected from a polarization beam splitter 107 is turned into a linearly polarized light beam at +45° by a half-wave plate 2103 having an axial orientation set at 22.5° before being split into a transmission beam as the p-polarization component, and a reflection beam as the s-polarization component by a polarization beam splitter 2104. Herein, the transmission beam, and the reflection beam are subjected to intensity modulation by the intensity modulators 2101, 2102, respectively, which are driven by drivers 2105, 2106, respectively, before being combined with each other again by a polarization beam splitter 2107. In this connection, the laser diode 103 capable of multimode oscillation is used, and a difference in the respective optical path lengths of the transmission beam, and the reflection beam, from the polarization beam splitter 2104 until combination of the beams with each other by the polarization beam splitter 2107, is set sufficiently larger than the coherence length of the laser diode 103 (in the case of the present embodiment, on the order of 100 μm), and a phase relationship between the p-polarization component and the s-polarization component after combination is undefined, that is, no coherence, in other words, is in a incoherent state. With the present embodiment, the difference in the respective optical lengths is set to 8 mm. A light beam after the combination of the beams is split into a signal beam, and a reference beam by a non-polarizing beam splitter 109 to be subsequently recorded in a recording medium 115, as is with the case with the third embodiment, however, the signal beam passes through optical phase modulators 2108, 2109 (driven by drivers 2114, 2115, respectively) immediately after outgoing from the non-polarizing beam splitter 109, whereupon optical phase modulation is applied to the p-polarization component, and the s-polarization component, respectively (such an operation for optical phase modulation, in a specific polarization direction, can be executed by use of an electro-optic crystal). Further, the reference beam is reflected by mirrors 2110, 2111, in pairs, and the mirrors in pairs are rendered movable in the direction of an incident light beam by use of an actuator 2112 such that a difference between the respective optical path lengths of the signal beam, and the reference beam, at a location where the signal beam, and the reference beam are condensed, will be nearly zero. For this reason, the actuator 2112 is controlled by a focusing error signal, and a displacement amount thereof is set to a half of a displacement amount of an objective lens 118.

At this point in time, the signal beam, and the reference beam each are in a state where the transmission beam and the reflection beam, generated at the polarization beam splitter 2104, are combined with each other in an incoherent state. However, light beams transmitted through the polarization beam splitter, contained in the signal beam, and the reference beam, respectively, are in the state of p-polarization, having coherence, at a location where the light beams are condensed in the recording medium, so that there occurs a standing wave. Similarly, light beam portions reflected by the polarization beam splitter, contained in the signal beam, and the reference beam, respectively, are in the state of s-polarization, having coherence, at a location where the light beams are condensed in the recording medium, so that there occurs a standing wave. Accordingly, recording by use of the transmission beam from the polarization beam splitter 2104 corresponds to the first recording according to the third embodiment, and recording by use of the reflection beam from the polarization beam splitter 2104 corresponds to the second recording according to the third embodiment. It follows that two operations for recording are concurrently executed. The reason why the difference is caused to occur in the optical path lengths between the transmission beam, and the reflection beam is to prevent those two beams from interfering with each other. By so doing, it is possible to realize an idealistic operation for multiplex recording whereby two operations for recording do not interfere with each other.

As for an operation at the time of regeneration, the axial orientation of the half-wave plate 2103 is set at 0°, thereby allowing all the beams to pass through the polarization beam splitter 2104, and the intensity modulator 2101 is set so as not to execute modulation (that is, not to cause attenuation in optical intensity). Otherwise, the operation is identical to that in the case of the third embodiment. By so doing, out of the recording medium 115 where the first recording and the second recording have been concurrently executed, it is possible to concurrently regenerate information recorded by those operations for recording.

Fifth Embodiment

Figure 22:
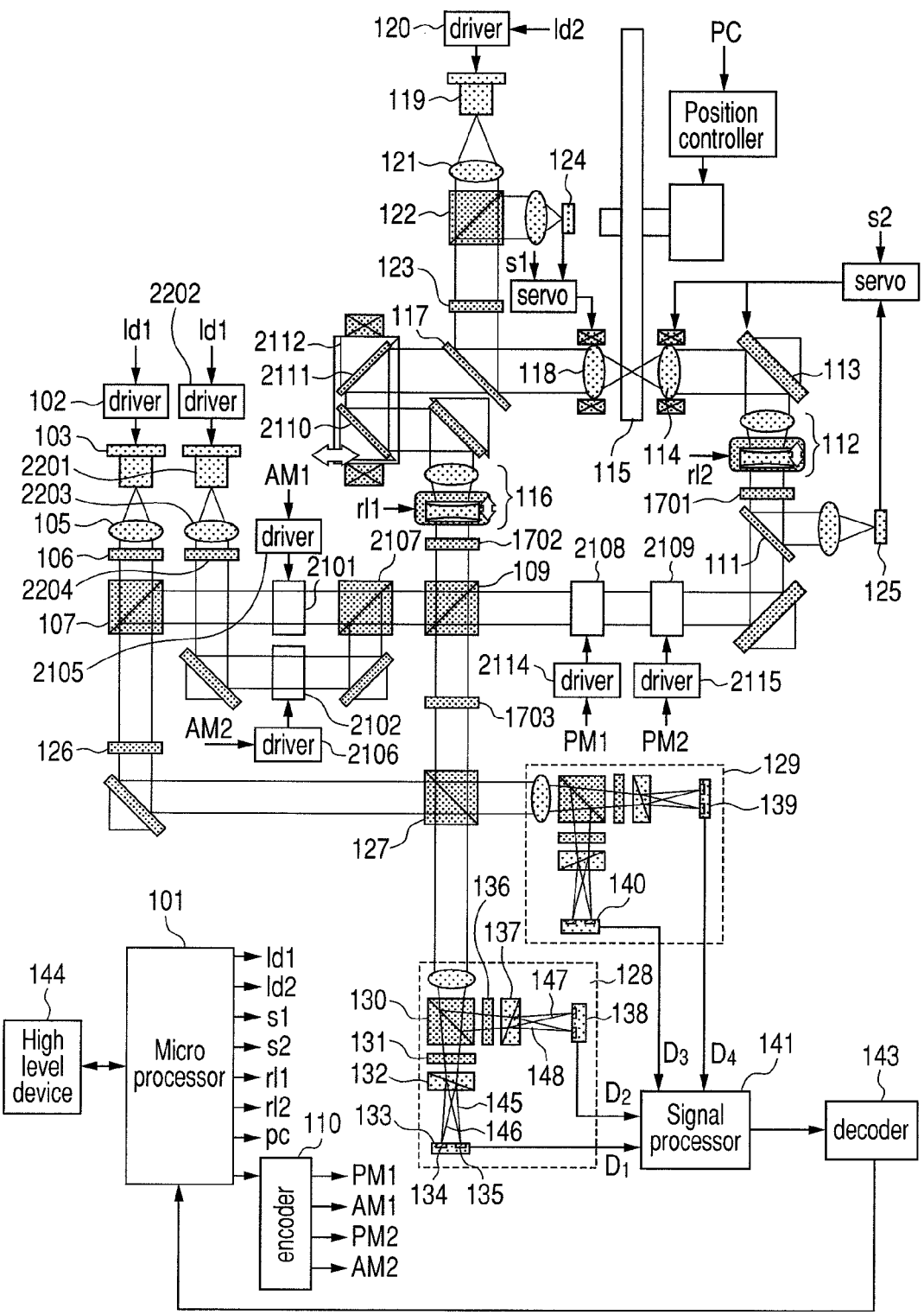
FIG. 22 is a block diagram of an optical device according to a fifth embodiment of the invention.

A fifth embodiment of an optical device according to the invention is another variation of the third embodiment, for concurrently realizing the first recording and the second recording executed in the case of the third embodiment. FIG. 22 is a block diagram showing a configuration according to the present embodiment. With the present embodiment, two laser diodes 103, 2201 capable of oscillating at respective wavelengths identical to each other are caused to concurrently emit a light beam, respectively, at the time of recording, thereby causing the light beams to be coaxial with each other by use of a polarization beam splitter 2107. The light beam outgoing from the laser diode 103 is modulated by an intensity modulator 2101, and an optical phase modulator 2108 (corresponding to the first recording), and the light beam outgoing from the laser diode 2201 is modulated by an intensity modulator 2102, and an optical phase modulator 2109 (corresponding to the second recording). In this case as well, as is the case with the fourth embodiment, a signal beam, and a reference beam each are in a state where a transmission beam and a reflection beam, generated at the polarization beam splitter 2104, are combined with each other in an incoherent state. And, light beams transmitted through the polarization beam splitter, contained in the signal beam, and the reference beam, respectively, are in the state of p-polarization, having coherence, at a location where the light beams are condensed in the recording medium, so that there occurs a standing wave. Similarly, light beam portions reflected by the polarization beam splitter, contained in the signal beam, and the reference beam, respectively, are in the state of s-polarization, having coherence, at a location where the light beams are condensed in the recording medium, so that there occurs a standing wave.

Further, at the time of regeneration, the laser diode 2201 is caused not to emit a light beam, and the laser diode 103 is caused to emit a light beam. Otherwise, operation is identical to that in the case of the fourth embodiment. With the present embodiment, under conditions that values of respective spectral linewidths of the laser diodes 103, 2201, converted in unit of time, are sufficiently shorter than emission time of pulse emission at the time of recording, interference between the respective light beams from the two laser diodes is negligible. With the present embodiment, since a center wavelength λ=405 nm, a linewidth Δλ=0.01 nm, and time equivalent to a linewidth is λ2/(cΔλ)=54 [ps] (c designates a high speed in a vacuum), which is sufficiently shorter than the emission time about 1 ns of pulse emission, so that no interference occurs between the first recording and the second recording, and an idealistic operation for multiplex recording can be realized.

Sixth Embodiment

Figure 23:
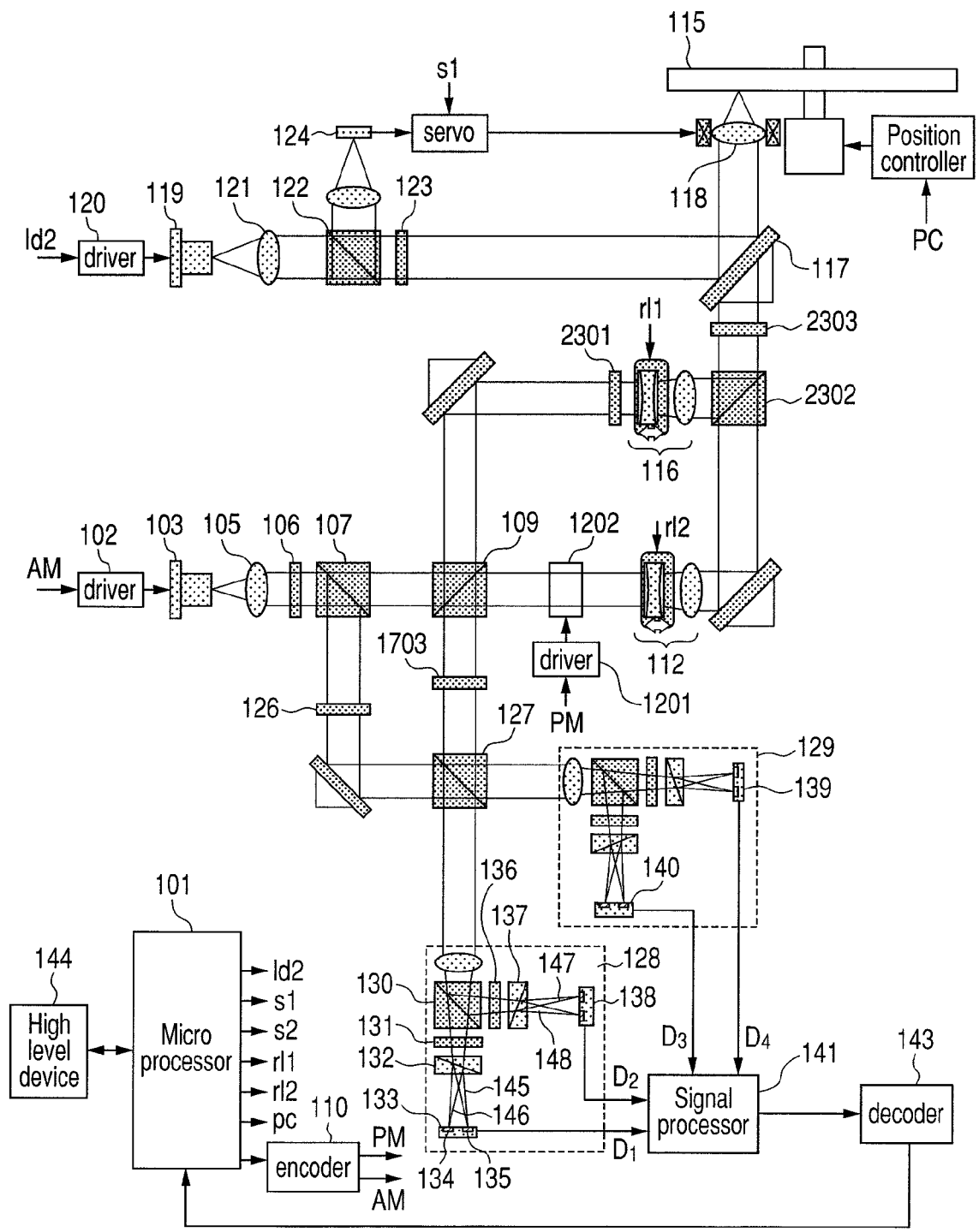
FIG. 23 is a block diagram of an optical device according to a sixth embodiment of the invention.
Figure 24:
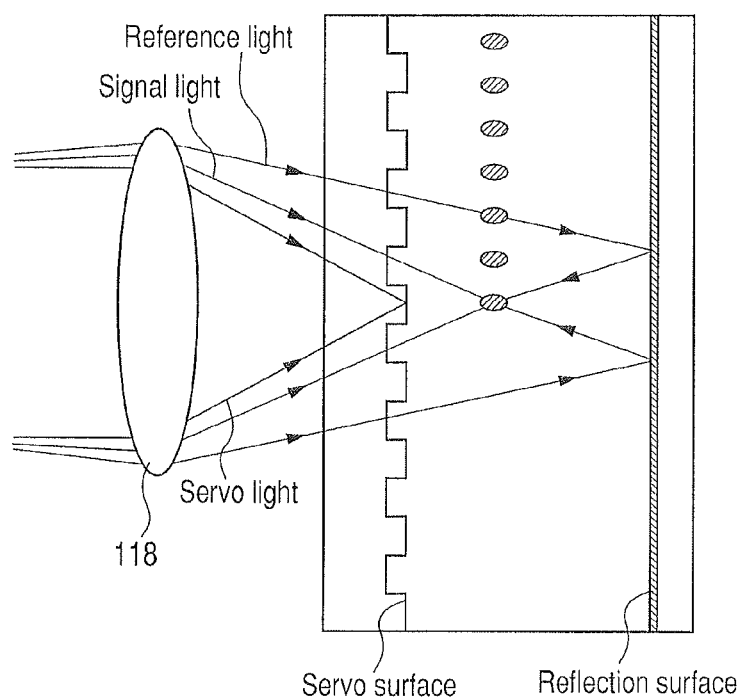
FIG. 24 is a schematic representation showing respective behaviors of a signal beam, a reference beam and a servo beam, inside a recording medium according to the sixth embodiment.
Figure 25:
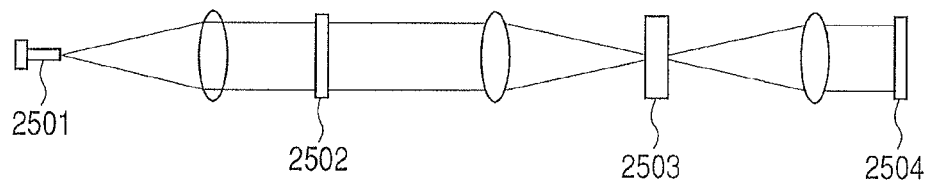
FIG. 25 is a view broadly showing a configuration according to a conventional technology, wherein optical phase modulation is executed in a hologram of page data.

A sixth embodiment of the invention is another embodiment of an optical device according to the invention, wherein enhancement in light-utilization efficiency is intended by causing two light beams in respective polarization states orthogonal to each other to fall on a recording medium from the same direction at the time of recording. FIG. 23 is a block diagram showing a configuration according to the present embodiment. First, at the time of recording, a light beam from a laser diode 103 is transmitted through a half-wave plate 106 whose axial direction is set at 0° to be split into a signal beam that is a transmission beam, and a reflection beam that is a reference beam by a non-polarizing beam splitter 109. The signal beam is subjected to optical phase modulation by an optical phase modulator 1202 to pass through a relay lens 112, a non-polarizing beam splitter 2302, a quarter-wave plate 2303 whose axial direction is set at 45°, and a dichroic mirror 117 before condensed in a recording medium 115 by an objective lens 118. On the other hand, the reference beam passes through a quarter-wave plate 2301 whose axial direction is set at 45°, and a relay lens 116 before being rendered coaxial with the signal beam, and subsequently, the reference beam is condensed in the recording medium 115, as is the case with the signal beam. Further, a servo beam is rendered coaxial with the reference beam, as is the case with the first embodiment, to be condensed in the recording medium 115. FIG. 24 shows an internal state of the recording medium at this point in time. The signal beam is condensed at a predetermined location inside the recording medium, and the reference beam is reflected by a reflection surface provided in the recording medium to be subsequently condensed at the same location as the predetermined location where the signal beam is condensed. Further, the servo beam is condensed on the servo layer provided in the recording medium, as is the case with the first embodiment. Thus, it is possible to execute data recording at a position where the signal beam and the reference beam are condensed, as is the case with the third embodiment. Further, in order to execute multiplex recording, the axial direction of the quarter-wave plate 2303 is varied two ways, that is, to 45°, and 135°, respectively, thereby recording different data blocks at respectively set angles.

At the time of regeneration, the axial direction of the half-wave plate 106 is set at 22.5°, and a light beam is split into the transmission beam in the p-polarization state, and the reflection beam in the s-polarization state, identical in intensity to each other. The transmission beam is split into a transmission beam, and a reflection beam by the non-polarizing beam splitter 109, and the transmission beam and the reflection beam each are condensed at a recording location in the recording medium in the same way as at the time of recording. However, when the relay lens 116 is adjusted, neither the transmission beam, nor the reflection beam is reflected from the reflection surface provided in the recording medium to be directly condensed at the recording location. Then, there occur regeneration beams for two kinds of data blocks where the reflection beam and the transmission beam each are subjected to multiplex recording, so that it is possible to concurrently regenerate multiplexed data by detecting these regeneration beams, as is the case with the third embodiment.

The present embodiment differs in configuration from the conventional technologies (for example, Patent Document 8) in that the respective polarization states of the signal beam, and the reference beam are orthogonal to each other, and the signal beam is combined with the reference beam by use of the non-polarizing beam splitter 2302, thereby enabling light-utilization efficiency at the time of recording to be enhanced.

Seventh Embodiment

Figure 29:
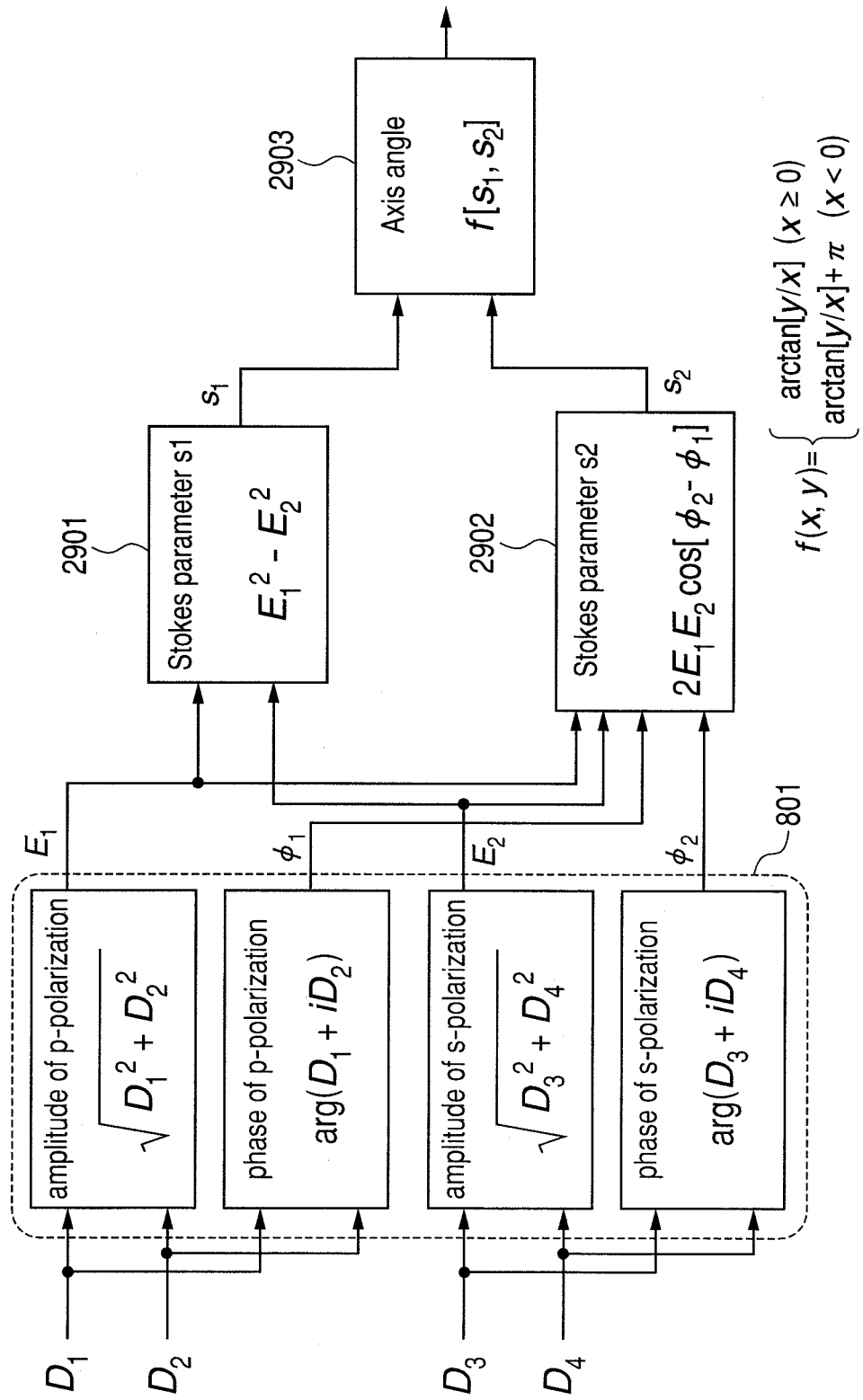
FIG. 29 is a block diagram showing a digital signal processing circuit according to a seventh embodiment of the invention.

A seventh embodiment of the invention is another embodiment of an optical device according to the invention, wherein a regeneration beam subjected to polarization multi-level modulation is detected from a recording medium different in kind from that for the embodiments described as above. FIG. 31 shows the configuration of the present embodiment, representing a configuration where a portion of the device according to the first embodiment, necessary only for recording, is omitted. The recording medium according to the present embodiment differs in that in the structure of the recording medium according to the first embodiment, shown in FIG. 6, there exist a recording layer where V-SHAPE GROOVE pits are arranged, similar to one shown in Non-patent Document 3 "Optics Express", Vol. 16, No. 13, 9622, in place of the location where the standing wave is recorded. When circularly polarized light is condensed and irradiated to the V-SHAPE GROOVE pits, elliptically polarized light having the major axis or the minor axis, in the direction of a V-SHAPE GROOVE, can be obtained as a regeneration beam. In an actual operation for regeneration, a light beam outgoing from a laser diode 103 is turned into circularly polarized light by use of a quarter-wave plate (not shown) inserted between a polarization beam splitter 107, and a non-polarizing beam splitter 109 to be condensed and irradiated to the recording medium, whereupon a reflection beam generated as a regeneration beam is detected by detection optical systems 128, 129, respectively, as in the case of the first embodiment. In a digital signal processing circuit 141, an operation shown in the block diagram of FIG. 29 is applied the regeneration beam, and as an output, an angle of the V-SHAPE GROOVE (in agreement with an angle of the major axis of the elliptically polarized light of the regeneration beam) is obtained as an output signal. In this operation, in order to obtain the angle of the major axis of the elliptically polarized light from electric fields E1, E2, and phases φ1, φ2 of the p-polarization, and the s-polarization, respectively, Stokes, parameters s1, s2 are found by calculation, thereby finding the angle of the major axis on the basis of a ratio, and plus/minus in sign as for Stokes parameters. A principle behind this operation is described in "Principle of Optics" by Max Born, Emil Worf, version 3, published by Cambridge University Press, 1965, pp. 23-36.

[Non-patent Document 3] "Optics Express", Vol. 16, No. 13, 9622

[Non-Patent Document 4]
"Principle of Optics" by Max Born, Emil Worf, version 3, published by Cambridge University Press, 1965, pp. 23-36

Eighth Embodiment

The present embodiment is another embodiment of the optical device according to the invention, wherein a regeneration beam subjected to polarization multi-level recording is obtained from the recording medium different from that according to the third embodiment. FIG. 31 shows the configuration of the present embodiment, similar to that according to the seventh embodiment. The recording medium according to the present embodiment differs in that in the structure of the recording medium according to the first embodiment, shown in FIG. 6, there exist a recording layer where gold nano-particles are arranged, similar to one shown in Non-patent Document 3 "Nature 459", by Peter Zijilstra, et al., pp. 410-413, in place of the location where the standing wave is recorded. This recording medium is subjected to polarization multi-level recording, and at the time of regeneration, an intensity modulation signal obtained in the case of irradiation with the p-polarization differs from an intensity modulation signal obtained in the case of irradiation with the s-polarization. In an actual operation for regeneration, a light beam outgoing from a laser diode 103 is turned into a linearly polarized light beam at +45° by use of a half-wave plate (not shown) inserted between a polarization beam splitter 107, and a non-polarizing beam splitter 109 to be condensed and irradiated to the recording medium 115, whereupon a reflection beam generated as a regeneration beam is detected by detection optical systems 128, 129, respectively, as in the case of the third embodiment. In a digital signal processing circuit 141, use is made of an operation whereby phase calculation is omitted from the operation shown in the block diagram of FIG. 18, and an intensity modulation signal for a p-polarization component and an intensity modulation signal for an s-polarization component are separately outputted. More specifically, the p-polarization component of the light beam irradiated to the recording medium and the s-polarization component thereof are each subjected to different intensity modulation to be then separately detected, so that it is possible to regenerate data blocks subjected to the polarization multi-level recording by one operation.

[Non-patent Document 5] "Nature 459", by Peter Zijilstra, et al., pp. 410-413

The invention has made it possible to provide an optical information recording and reproducing device capable of striking a balance between large capacity and high transfer rate, and widespread industrial application including a large-capacity video recorder, a hard disk backup device, and a preserved information archive device can be expected.

What is claimed is:

1. An optical information recording device comprising:
a unit configured to cause two light beams, proceeding from directions opposing each other, to be condensed at a substantially identical location in an optical information recording medium, resulting in recording a standing wave occurring due to interference between the two light beams;
a polarization modulation unit configured to modulate a polarization of at least one of the two light beams in multi-levels, in order to record information with each multi-leveled modulation;
wherein an optical phase modulation amount of the polarization modulation unit is in strictly linear relationship with the rotation angle of the polarization.

2. The optical information recording device according to claim 1, wherein the polarization modulation unit is an electro-optical modulator.

3. The optical information recording device according to claim 1, wherein the polarization modulation unit is configured to execute modulation such that the polarization states of the two light beams respectively becomes linear polarization states in which oscillation directions of electric fields of the two light beams are identical to each other at a location where the two light beams are condensed in the recording medium.

4. The optical information recording device according to claim 1, wherein the two light beams are generated by splitting a single light beam by use of a non-polarization splitting unit, and the polarization modulation unit is a single polarization modulation unit configured to modulate a polarization state of the single light beam.

5. The optical information recording device according to claim 1, further comprising at least either of an optical phase modulation unit configured to modulate a phase state of at least one of the two light beams and an intensity modulation units configured to modulate intensity of at least one of the two light beams, wherein the standing wave in a state where the polarization modulation unit, and the at least either of the optical phase modulation unit and the intensity modulation unit concurrently executes a modulation operation is recorded in the recording medium.

6. A method for recording information, comprising:
causing two light beams, proceeding from directions opposing each other, to be condensed on locations substantially identical to each other in a recording medium, wherein the direction of a change in refractive index in the oscillation direction of an optical electric field in as-irradiated state, and the direction of a change in refractive index in the direction perpendicular thereto are caused to oppose each other;
modulating a polarization of at least one of the two light beams in multi-levels, in order to record information with each multi-leveled modulation, resulting in recording a standing wave occurring due to interference between the two light beams; and
wherein an optical phase modulation amount of the polarization modulating step is in strictly linear relationship with the rotation angle of the polarization.

* * * * *